(12) United States Patent
Noguchi et al.

(10) Patent No.: US 9,441,526 B2
(45) Date of Patent: Sep. 13, 2016

(54) CONSTRUCTION MACHINE

(71) Applicant: HITACHI CONSTRUCTION MACHINERY CO., LTD., Tokyo (JP)

(72) Inventors: Shuuhei Noguchi, Higashiomi (JP); Hajime Yoshida, Omihachiman (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 177 days.

(21) Appl. No.: 14/361,023

(22) PCT Filed: Dec. 24, 2012

(86) PCT No.: PCT/JP2012/083372
§ 371 (c)(1),
(2) Date: May 28, 2014

(87) PCT Pub. No.: WO2013/105423
PCT Pub. Date: Jul. 18, 2013

(65) Prior Publication Data
US 2014/0318883 A1    Oct. 30, 2014

(30) Foreign Application Priority Data

Jan. 13, 2012  (JP) ................................ 2012-004944

(51) Int. Cl.
*B60K 13/04*    (2006.01)
*F01N 11/00*    (2006.01)
(Continued)

(52) U.S. Cl.
CPC ......... *F01N 11/002* (2013.01); *B01D 46/0086* (2013.01); *B60K 13/04* (2013.01); *E02F 3/325* (2013.01); *E02F 9/0866* (2013.01);
(Continued)

(58) Field of Classification Search
CPC ..... B60K 13/04; F01N 3/023; F01N 3/0233; F01N 3/0235; F01N 3/025; F01N 3/0253; F01N 3/0256; F01N 9/002; F01N 9/005
See application file for complete search history.

(56) References Cited

U.S. PATENT DOCUMENTS 5,195,316 A    3/1993  Shinzawa et al.
6,907,873 B2 *  6/2005  Hamahata ............... F01N 9/002
                                                      123/676
(Continued)

FOREIGN PATENT DOCUMENTS

JP    03-199616 A    8/1991
JP    07-011935 A    1/1995
(Continued)

*Primary Examiner* — Katy M Ebner
(74) *Attorney, Agent, or Firm* — Mattingly & Malur, PC

(57) ABSTRACT

A regeneration device that performs regeneration treatment of a particulate matter removing filter estimates a trapping amount of particulate matter trapped in the filter by two systems. Specifically, there are provided an estimating unit that estimates a first estimated trapping amount based upon a rotational speed of an engine and a fuel injection quantity and an estimating unit that estimates a second estimated trapping amount based upon a differential pressure across the particulate matter removing filter. The regeneration device determines whether or not the regeneration treatment is executed based upon whether or not at least one of the two estimated trapping amount is equal to or more than a preset trapping amount threshold value. Further, the regeneration device determines that there is a malfunction in the regeneration device in a case where the second estimated trapping amount is larger than the first estimated trapping amount.

6 Claims, 11 Drawing Sheets

(51) Int. Cl.
*E02F 9/08* (2006.01)
*E02F 9/20* (2006.01)
*E02F 9/26* (2006.01)
*B01D 46/00* (2006.01)
*F01N 9/00* (2006.01)
*F01N 3/023* (2006.01)
*F02D 41/02* (2006.01)
*E02F 3/32* (2006.01)
*F02D 41/14* (2006.01)
*F02D 41/40* (2006.01)
*F02D 41/22* (2006.01)
*F01N 13/00* (2010.01)

(52) U.S. Cl.
CPC ........... *E02F9/2066* (2013.01); *E02F 9/2095* (2013.01); *E02F 9/267* (2013.01); *F01N 3/023* (2013.01); *F01N 3/0235* (2013.01); *F01N 9/002* (2013.01); *F01N 11/00* (2013.01); *F02D 41/029* (2013.01); *F02D 41/0235* (2013.01); *F01N 13/008* (2013.01); *F01N 2240/36* (2013.01); *F01N 2550/04* (2013.01); *F01N 2560/06* (2013.01); *F01N 2560/08* (2013.01); *F01N 2560/14* (2013.01); *F01N 2590/08* (2013.01); *F01N 2900/0412* (2013.01); *F01N 2900/0422* (2013.01); *F01N 2900/08* (2013.01); *F01N 2900/1606* (2013.01); *F02D 41/0245* (2013.01); *F02D 41/1448* (2013.01); *F02D 41/405* (2013.01); *F02D 2041/227* (2013.01); *F02D 2041/228* (2013.01); *F02D 2200/0614* (2013.01); *F02D 2200/0812* (2013.01); *F02D 2200/101* (2013.01); *Y02T 10/47* (2013.01)

(56) References Cited

U.S. PATENT DOCUMENTS

| | | | |
|---|---|---|---|
| 6,941,750 B2 * | 9/2005 | Boretto | F01N 3/035 55/DIG. 30 |
| 7,065,960 B2 * | 6/2006 | Gioannini | F01N 9/002 60/274 |
| 8,286,420 B2 * | 10/2012 | Ide | F01N 3/021 60/277 |
| 8,915,067 B2 * | 12/2014 | Oohashi | B01D 46/0057 60/295 |
| 9,067,160 B2 * | 6/2015 | Ikeda | F01N 3/0235 |
| 2004/0260452 A1 | 12/2004 | Hamahata | |
| 2007/0193256 A1 * | 8/2007 | Matsuno | F01N 3/0253 60/295 |
| 2012/0116645 A1 | 5/2012 | Hamahata et al. | |
| 2012/0291629 A1 * | 11/2012 | Tylutki | F01N 3/103 95/23 |

FOREIGN PATENT DOCUMENTS

| | | |
|---|---|---|
| JP | 07-317529 A | 12/1995 |
| JP | 11-013455 A | 1/1999 |
| JP | 2002-256846 A | 9/2002 |
| JP | 2004-76589 A | 3/2004 |
| JP | 2004-132358 A | 4/2004 |
| JP | 2010-065577 A | 3/2010 |

* cited by examiner

CONSTRUCTION MACHINE

TECHNICAL FIELD

The present invention relates to a construction machine that is provided with an exhaust gas purifying device suitable for removing harmful substances from an exhaust gas in a diesel engine, for example, or the like.

BACKGROUND ART

A construction machine such as a hydraulic excavator or a hydraulic crane is generally configured by an automotive lower travelling structure, an upper revolving structure mounted on the lower travelling structure to be capable of revolving thereon, and a working mechanism tiltably mounted on a front side of the upper revolving structure. The upper revolving structure mounts an engine on a rear portion in a revolving frame for driving a hydraulic pump, and mounts a cab, a fuel tank, an operating oil tank and the like on a front side in the revolving frame.

Here, a diesel engine is generally used as an engine that is a prime mover of a hydraulic excavator. There are some cases where harmful substances such as particulate matter (PM) and nitrogen oxides (NOx) are contained in an exhaust gas discharged from such a diesel engine. Therefore, the construction machine is provided with an exhaust gas purifying device in an exhaust pipe forming an exhaust gas passage of the engine for purifying an exhaust gas therein.

The exhaust gas purifying device is configured by including an oxidation catalyst (for example, diesel oxidation catalyst, referred to as "DOC" for short) for oxidizing and removing nitrogen monoxides (NO), carbon monoxides (CO), hydrocarbon (HC) that are contained in an exhaust gas, and a particulate matter removing filter (for example, diesel particulate filter, referred to as "DPF" for short) that is arranged downstream side of the oxidation catalyst for trapping and removing particulate matter in the exhaust gas (Patent Document 1).

Incidentally, in the particulate matter removing filter, the particulate matter is accumulated therein following the trapping of the particulate matter, which might cause the filter to be clogged. Therefore, it is necessary to remove the particulate matter from the filter in a point where a predetermined amount of the particulate matter is trapped for regenerating the filter. This regeneration of the filter can be performed in such a manner that fuel injection for regeneration treatment called "post injection" is performed to increase a temperature of an exhaust gas for burning the particulate matter that is accumulated in the filter.

On the other hand, when the regeneration treatment is executed in a point where the particulate matter is excessively accumulated in the filter, the temperature of the exhaust gas rises to be excessively high (a combustion temperature of the particulate matter is excessively high), which might possibly cause the filter to be melted and damaged. Therefore, the conventional art is configured such that a trapping amount of the particulate matter trapped in the filter is estimated, and, based thereon the regeneration treatment is executed before the estimated trapping amount becomes excessively large.

More specifically an emission amount (generating amount) of particulate matter that is discharged from the engine is estimated based upon a rotational speed of an engine, a fuel injection quantity and the like, and the regeneration treatment is executed at the time the estimated amount reaches a preset threshold value (Patent Document 2 and Patent Document 3).

Following an elapse of driving time, substances other than the particulate matter that has been burned and removed by the regeneration treatment, that is, ashes contained in engine oil, fuel or the like, which have not been burned or removed by the regeneration treatment, are accumulated in the filter. The other conventional art is configured such that an amount of the above ashes accumulated in the filter is estimated based upon the number of times by which the regeneration treatment has been executed, and the regeneration treatment is executed based upon the estimated amount of the ashes together with the amount of the particulate matter (Patent Document 4).

PRIOR ART DOCUMENT

Patent Document

Patent Document 1: Japanese Patent Laid-Open No. 2010-65577 A

Patent Document 2: Japanese Patent Laid-Open No. Hei 11-13455 A

Patent Document 3: Japanese Patent Laid-Open No. 2004-132358 A

Patent Document 4: Japanese Patent Laid-Open No. Hei 7-11935 A

SUMMARY OF THE INVENTION

Incidentally, some of fuels of an engine or engine oils are fuels or engine oils of low quality, for example, low-quality fuel and low-quality oil that contain a large deal of sulfur contents, additives, ashes that cannot be burned or removed by the regeneration treatment, and the like. When this fuel or engine oil of low quality is used, an emission amount of the particulate matter increases, which might possibly increase the frequency of the regeneration treatment and deteriorate performance of the filter.

The conventional art according to Patent Document 2 is configured such that a corresponding relation between a rotational speed of an engine, a fuel injection quantity, and a generating amount of particulate matter is in advance produced as a map, and a trapping amount of the particulate matter trapped in a filter is estimated using this map. Here, since the map is produced using fuel or engine oil of standard quality, when fuel or engine oil of low quality, for example, is used, there is a possibility that an error between the trapping amount to be estimated and an actual trapping amount becomes large. When the engine continues to operate in a state where the error is large, the regeneration treatment is executed in a state where the particulate matter is excessively accumulated in the filter to excessively increase a temperature of the filter, thus possibly deteriorating durability of the filter. Further, there is also a possibility of deteriorating durability of equipment configuring a fuel injection system of the engine and the like.

The conventional art according to Patent Document 4 is configured such that the regeneration treatment is executed by considering ashes accumulated in the filter as well, but has a possibility of being incapable of sufficiently ensuring estimation accuracy of the ash. Particularly this conventional art cannot cope with varying factors generated in a case where the fuel or engine oil of low quality is temporarily used, which might possibly deteriorate durability of the filter or the engine as similar to the conventional art by Patent Document 2.

In view of the aforementioned problems in the conventional art, it is an object of the present invention is to provide a construction machine that can prevent durability of a filter or an engine from being deteriorated due to use of fuel or engine oil of low quality to improve reliability and stability.

(1) A construction machine according to the present invention comprises an automotive vehicle body; an engine that is mounted on the vehicle body; an exhaust gas purifying device that is provided in an exhaust side of the engine and includes a filter for trapping particulate matter in an exhaust gas discharged from the engine, and a regeneration device that burns particulate matter trapped in the filter in the exhaust gas purifying device to execute regeneration treatment of the filter.

In order to solve the above-described problem, the configuration adopted by the present invention is characterized in that the regeneration device comprises a first trapping amount estimating unit configured to estimate a trapping amount of particulate matter trapped in the filter based upon at least a rotational speed of the engine and a fuel injection quantity; a second trapping amount estimating unit configured to estimate a trapping amount of particulate matter trapped in the filter based upon a differential pressure ($\Delta p=P1-P2$) that is at least a difference between a pressure (P1) in an inlet side of the filter and a pressure (P2) in an outlet side thereof; a regeneration determining unit configured to determine whether or not the regeneration treatment is executed based upon whether or not at least one of a first estimated trapping amount (Q1) estimated by the first trapping amount estimating unit and a second estimated trapping amount (Q2) estimated by the second trapping amount estimating unit is equal to or more than a preset trapping amount threshold value (Qs); and a malfunction determining unit configured to determine that there is a malfunction in the regeneration device in a case where the second estimated trapping amount (Q2) is larger than the first estimated trapping amount (Q1).

With this arrangement, when the second estimated trapping amount (Q2) is larger than the first estimated trapping amount (Q1) due to use of the engine oil or fuel of low quality, the malfunction determining unit can determine that there is the malfunction in the regeneration device (or has a possibility of being the malfunction). Therefore, maintenance and repair necessary for replacement of engine oil or fuel can be performed to improve reliability and stability of the construction machine.

(2) According to the present invention, the trapping amount threshold value (Qs) is a determination value for determining whether or not the particulate matter trapped in the filter reaches a trapping amount necessary for the regeneration treatment of the filter. With this arrangement, the regeneration treatment can be executed by the regeneration device when the particulate matter is determined to be trapped in the filter on a basis of the trapping amount threshold value (Qs).

(3) According to the present invention, the regeneration device is configured such that, at the time of executing the regeneration treatment of the filter, fuel injection for regeneration is performed by a fuel injection device of the engine or at least one of an intake throttle valve provided in an intake side of the engine and an exhaust throttle valve in an exhaust side of the engine is operated in a direction of throttling a flow passage thereof to burn the particulate matter trapped in the filter. With this arrangement, the regeneration treatment can be executed by a method suitable for the kind of the engine.

(4) According to the present invention, the malfunction determining unit determines that there is the malfunction in the regeneration device in a case where a difference ($\Delta Q=Q2-Q1$) between the first estimated trapping amount (Q1) and the second estimated trapping amount (Q2) is equal to or more than a preset predetermined value ($\Delta Qs$) and a continuous time (T) in a state where the difference is equal to or more than the predetermined value ($\Delta Qs$) is equal to or more than a preset predetermined time (Ts).

With this arrangement, the determination on the malfunction can be made based upon the difference ($\Delta Q=Q2-Q1$) between the first estimated trapping amount (Q1) and the second estimated trapping amount (Q2), and the continuous time (T) in a state where the difference ($\Delta Q$) is equal to or more than the predetermined value ($\Delta Qs$). Therefore, the determination that there is the malfunction in the filter or the engine (or there might possibly be the malfunction) due to use of the fuel or engine oil of low quality can stably be made.

(5) According to the present invention, the malfunction determining unit determines that there is the malfunction in the regeneration device in a case where an interval ($\Delta K$) of the regeneration treatment executed when the second estimated trapping amount (Q2) is equal to or more than the trapping amount threshold value (Qs) becomes within a preset predetermined time ($\Delta Ks$) and the number of times (C) by which the regeneration treatment is executed by the interval within the predetermined time ($\Delta Ks$) reaches a preset predetermined number of times (Cs).

With this arrangement, the determination on the malfunction can be made based upon the interval ($\Delta K$) and the number of times (C) of the regeneration treatment. Therefore, the determination that there is the malfunction in the filter or the engine (or there might possibly be the malfunction) due to use of the fuel or engine oil of low quality can stably be made.

(6) According to the present invention, the malfunction determining unit determines that there is the malfunction in the regeneration device in a case where a difference ($\Delta Q=Q2-Q1$) between the first estimated trapping amount (Q1) and the second estimated trapping amount (Q2) is equal to or more than a preset predetermined value ($\Delta Qs$), an interval ($\Delta L$) of the regeneration treatment executed in this state becomes within a preset predetermined time ($\Delta Ls$), and the number of times (M) by which the regeneration treatment is executed by the interval within the predetermined time ($\Delta Ls$) reaches a preset predetermined number of times (Ms).

With this arrangement, the determination on the malfunction can be made based upon the difference ($\Delta Q=Q2-Q1$) between the first estimated trapping amount (Q1) and the second estimated trapping amount (Q2), the interval ($\Delta L$) of the regeneration treatment executed in a state where the difference ($\Delta Q$) is equal to or more than the predetermined value ($\Delta Qs$), and the number of times (M) of the regeneration process. Therefore, the determination that there is the malfunction in the filter or the engine (or there might possibly be the malfunction) due to use of the fuel or engine oil of low quality can stably be made.

(7) According to the present invention, in a case where the malfunction determining unit determines that there is the malfunction in the regeneration device, the malfunction determining unit outputs a signal for giving an alarm that there is the malfunction to an operator getting on the vehicle body.

With this arrangement, in a case where the malfunction determining unit determines that there is the malfunction in the regeneration device (or there might possibly be the malfunction), since the alarm is given to the operator, maintenance or repair of the construction machine can be performed in response to the alarm. This prevents durability of the filter or the engine from being deteriorated or excessive malfunctions thereof from occurring.

(8) According to the present invention, in a case where the malfunction determining unit determines that there is the malfunction in the regeneration device, the malfunction determining unit restricts output of the engine to be smaller than rated power.

With this arrangement, in a case where the malfunction determining unit determines that there is the malfunction in the regeneration device, the output of the engine can be restricted to be smaller than the rated power. Therefore, even in a case where fuel or engine oil of low quality is used, it is possible to restrict large loads from being applied to the engine. As a result, it is possible to prevent deterioration in durability and the excessive malfunction of the engine or the filter.

BRIEF DESCRIPTION OF THE DRAWINGS

FIG. 3 is a circuit configuration diagram showing an engine, an exhaust gas purifying device, a regeneration device, and the like.

MODE FOR CARRYING OUT THE INVENTION

Figure 1:
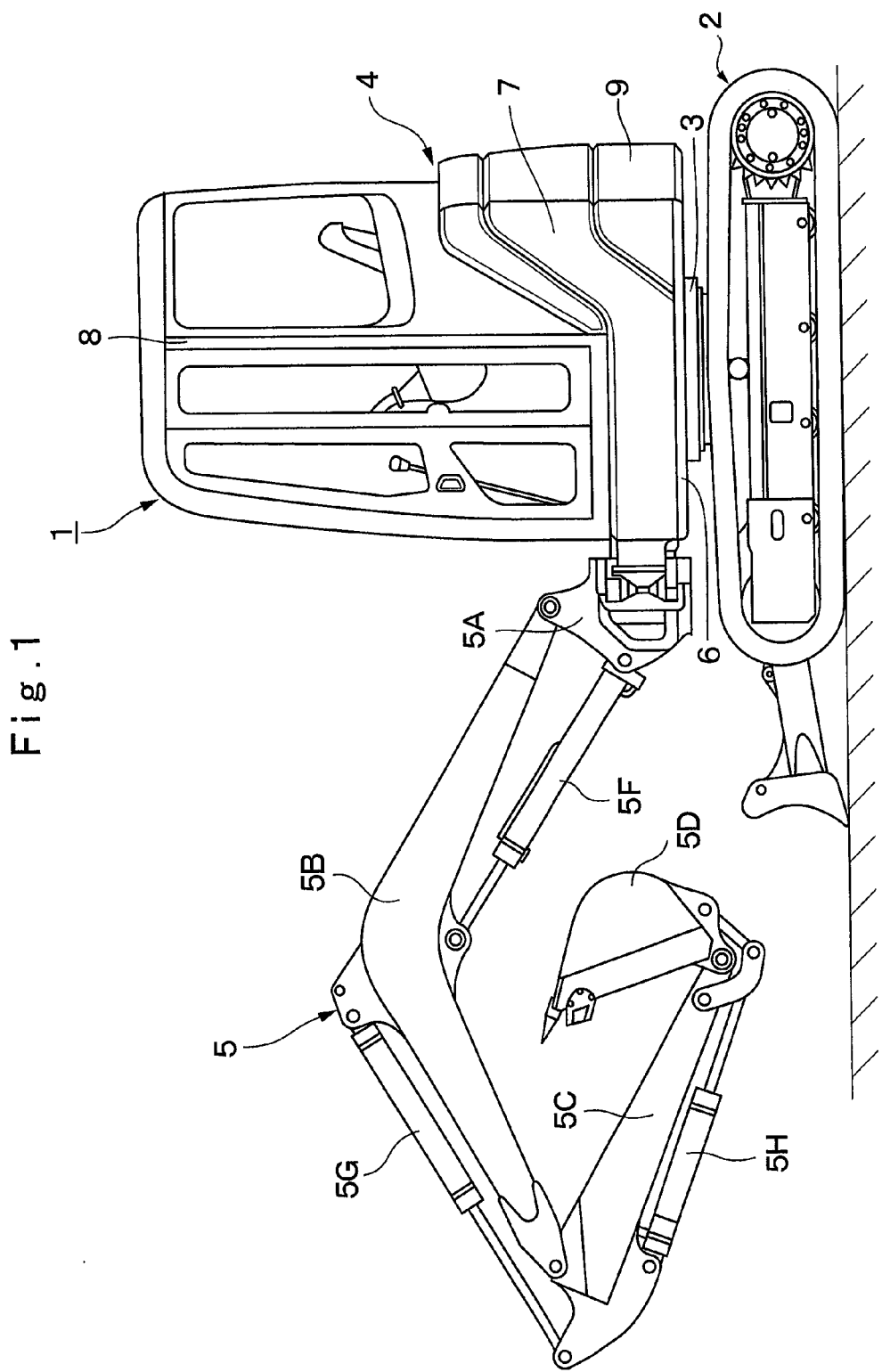
FIG. 1 is a front view showing a hydraulic excavator that is applied to a first embodiment of the present invention.

Hereinafter, embodiments of a construction machine according to the present invention will be in detail explained referring to the accompanying drawings by taking a case where the construction machine is applied to a small-sized hydraulic excavator called "mini excavator" as an example.

FIG. 1 to FIG. 6 show a first embodiment of a construction machine according to the present invention.

In the figure, designated at 1 is a small-sized hydraulic excavator used for an excavating work of sand and earth or the like. The hydraulic excavator 1 is configured schematically by a crawler type of automotive lower traveling structure 2, an upper revolving structure 4 that is mounted through a revolving device 3 on the lower traveling structure 2 to be capable of revolving thereon and configures a vehicle body together with the lower traveling structure 2, and a working mechanism 5 that is tiltably provided in a front side of the upper revolving structure 4.

Here, the working mechanism 5 is formed as a swing post type working mechanism, and is provided with, for example, a swing post 5A, a boom 5B, an arm 5C, a bucket 5D as a working tool, a swing cylinder 5E (refer to FIG. 2) for swinging the working mechanism 5 in the left-right direction, a boom cylinder 5F, an arm cylinder 5G, and a bucket cylinder 5H. The upper revolving structure 4 is configured by a revolving frame 6, an exterior cover 7, a cab 8, and a counterweight 9, which will be described later, and the like.

The revolving frame 6 forms part of a structure of the upper revolving structure 4. The revolving frame 6 is mounted through the revolving device 3 on the lower traveling structure 2. The revolving frame 6 is provided with the counterweight 9 and the engine 10 in the rear portion side, which will be described later, and the cab 8 in the left front side, which will be described later. The revolving frame 6 is provided with the exterior cover 7 that is positioned between the cab 8 and the counterweight 9, and this exterior cover 7 defines a space that accommodates the engine 10, a hydraulic pump 15, a heat exchanger 17, an exhaust gas purifying device 18 and the like, together with the revolving frame 6, the cab 8 and the counterweight 9.

The cab 8 is mounted in the left front side of the revolving frame 6, and the cab 8 defines therein an operator's room in which an operator gets. An operator's seat on which the operator is seated, various operational levers, an alarm 27 which will be described later (refer to FIG. 3) and the like are disposed inside the cab 8.

Figure 2:
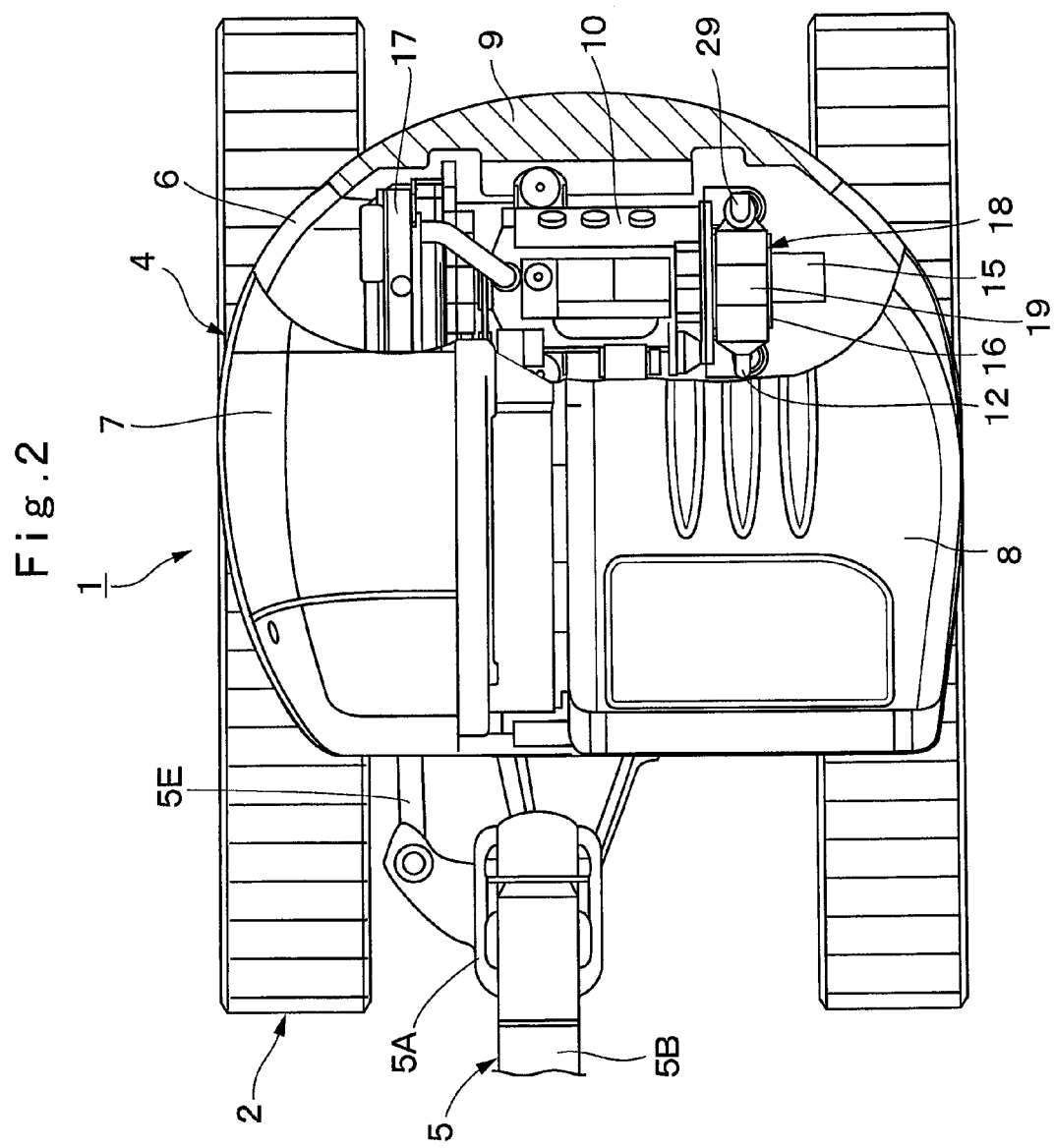
FIG. 2 is a partial cutaway plan view in which the hydraulic excavator is enlarged in a state where a cab and an exterior cover are partially removed from an upper revolving structure in FIG. 1.

The counterweight 9 acts as a weight balance to the working mechanism 5. The counterweight 9 is mounted at the rear end portion of the revolving frame 6 to be positioned in the rear side of the engine 10 which will be described later. As shown in FIG. 2, the counterweight 9 is formed in a circular shape on the rear surface side to be accommodated within a vehicle width of the lower traveling structure 2.

Indicated at 10 is the engine mounted in the rear side of the revolving frame 6 in a transversely placed state. The engine 10 is mounted on the small-sized hydraulic excavator 1 as a prime mover, and is therefore configured by a small-sized diesel engine, for example. The engine 10 is provided with an intake pipe 11 for taking in outside air (refer to FIG. 3) and an exhaust pipe 12 forming a part of an exhaust gas passage for discharging an exhaust gas. Outside air flows in the intake pipe 11 toward the engine 10, and an air cleaner 13 is connected to the intake pipe 11 in a tip end side for purifying the outside air. The exhaust gas purifying device 18 which will be described later is provided to be connected to the exhaust pipe 12.

Here, the engine 10 is configured by an electronically controlled engine, and a supply amount of fuel thereto is variably controlled by a fuel injection device 14 (refer to FIG. 3) such as an electronically controlled injection valve.

That is, the fuel injection device 14 variably controls an injection quantity of fuel (fuel injection quantity) injected into a cylinder (not shown) of the engine 10 based upon a control signal that is output from a controller 28 which will be described later.

Further, the fuel injection device 14 configures part of a regeneration device 22 together with the controller 28 which will be described later and the like. The fuel injection device 14 performs fuel injection for regeneration treatment, for example, called "post injection" (additional injection after combustion process) in response to a control signal from the controller 28. This post injection increases a temperature of an exhaust gas to burn and remove particulate matter accumulated in a particulate matter removing filter 21 in the exhaust gas purifying device 18 which will be described later.

The hydraulic pump 15 is mounted to the left side of the engine 10. The hydraulic pump 15 forms part of a hydraulic source together with an operating oil tank (not shown). The hydraulic pump 15 is configured by, for example, a swash plate type, bent axis type or radial piston type hydraulic pump of a variable displacement type. It should be noted that the hydraulic pump 15 is not necessarily limited to the hydraulic pump of a variable displacement type, but may be configured by using a hydraulic pump of a fixed displacement type.

As shown in FIG. 2, a power transmission device 16 is mounted to the left side of the engine 10, and rotational output of the engine 10 is transmitted through the power transmission device 16 to the hydraulic pump 15. The hydraulic pump 15 is driven by the engine 10 to deliver pressurized oil (operating oil) toward a control valve (not shown).

The heat exchanger 17 is provided on the revolving frame 6 to be positioned to the right side of the engine 10. The heat exchanger 17 is configured by, for example, a radiator, an oil cooler, and an intercooler. That is, the heat exchanger 17 performs cooling of the engine 10, as well as cooling of pressurized oil (operating oil) that is returned back to the operating oil tank.

Next, explanation will be made of the exhaust gas purifying device 18 for purifying an exhaust gas discharged from the engine 10.

That is, designated at 18 is the exhaust gas purifying device that is provided in the exhaust side of the engine 10. As shown in FIG. 2, the exhaust gas purifying device 18 is arranged in the upper portion left side of the engine 10 in a position above the power transmission device 16, for example, and is connected at the upstream side to the exhaust pipe 12 of the engine 10. The exhaust gas purifying device 18 forms part of an exhaust gas passage together with the exhaust pipe 12 and removes harmful substances contained in an exhaust gas during a period where the exhaust gas flows from the upstream side to the downstream side of the exhaust gas passage.

That is, the engine 10 comprising a diesel engine has a high efficiency and is excellent in durability, but harmful substances such as particulate matter (PM), nitrogen oxides (NOx), and carbon monoxides (CO) are contained in the exhaust gas from the engine 10. Therefore, as shown in FIG. 3, the exhaust gas purifying device 18 mounted on the exhaust pipe 12 is configured to include an oxidation catalyst 20 for oxidizing and removing carbon monoxides (CO) or the like in the exhaust gas and a particulate matter removing filter 21, which will be described later, for trapping and removing particulate matter (PM) in the exhaust gas.

Figure 3:
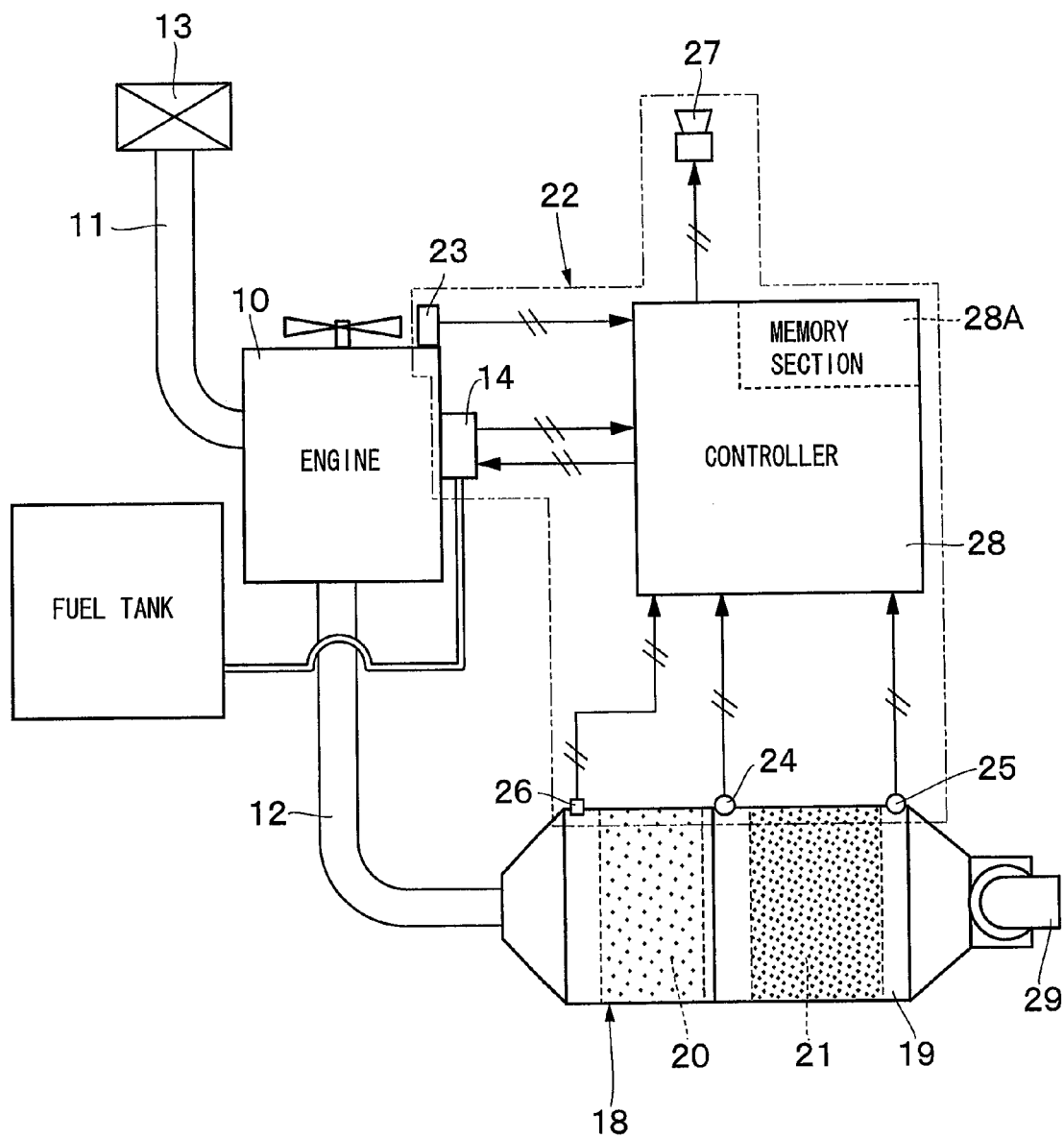

As shown in FIG. 3, the exhaust gas purifying device 18 is provided with a cylindrical casing 19 configured by removably connecting a plurality of cylinders before and after, for example. The oxidation catalyst 20 and the particulate matter removing filter 21 as the filter are removably accommodated in the casing 19.

The oxidation catalyst 20 comprises a cell-shaped cylinder made of ceramic having an outer diameter dimension that is equivalent to an inner diameter dimension of the casing 19, for example. Many through holes (not shown) are axially formed in the oxidation catalyst 20, an inner surface of which is coated with noble metals. The oxidation catalyst 20 oxidizes and removes carbon monoxides (CO), hydrocarbon (HC), and the like contained in the exhaust gas, and removes nitrogen oxides (NO) as nitrogen dioxides ($NO_2$) by circulating an exhaust gas into each through hole under a predetermined temperature condition.

On the other hand, the particulate matter removing filter 21 is arranged in the casing 19 downstream of the oxidation catalyst 20. The particulate matter removing filter 21 traps particulate matter in the exhaust gas discharged from the engine 10, and burns and removes the trapped particulate matter to perform purification of the exhaust gas. Therefore, the particulate matter removing filter 21 is configured by a cell-shaped cylinder, for example, made of a ceramic material, which is a porous member having many small bores (not shown) in an axial direction. Thereby, the particulate matter removing filter 21 traps particulate matter through many small bores, and the trapped particulate matter is burned and removed by regeneration treatment of the regeneration device 22 which will be described later. As a result, the particulate matter removing filter 21 is regenerated.

Next, explanation will be made of the regeneration device 22 for executing the regeneration treatment of the filter 21.

That is, designated at 22 is the regeneration device for executing the regeneration treatment of the filter 21 by burning the particulate matter trapped in the particulate matter removing filter 21 in the exhaust gas purifying device 18. The regeneration device 22 is configured by including the aforementioned fuel injection device 14, a below-mentioned rotational sensor 23, pressure sensors 24 and 25, an exhaust gas temperature sensor 26, an alarm 27, and the controller 28. The regeneration device 22 performs post injection by the fuel injection device 14 in response to a command signal (control signal) of the controller 28. This post injection, as described later, increases a temperature of an exhaust gas in the exhaust pipe 12 to burn and remove the particulate matter accumulated in the particulate matter removing filter 21.

Here, the regeneration device 22 has an automatic regeneration function of automatically executing the regeneration treatment based upon determination of the controller 28, and a malfunction alarming function of alarming an operator of a malfunction in a case where it is determined that there is the malfunction in the regeneration device 22 or the engine 10 by the controller 28. More specifically, in a case where it is determined that there is the malfunction in the regeneration device 22 or the engine 10 or there might possibly be the malfunction (hereinafter, there is the malfunction) due to use of fuel or engine oil of low quality, the malfunction alarming function is to give an alarm that there is the malfunction to an operator. In this case, the controller 28 is also provided with a function of restricting a rotational speed of the engine 10.

The rotational sensor 23 detects a rotational speed of the engine 10, and the rotational sensor 23 detects a rotational speed N of the engine 10 and outputs the detection signal to the controller 28 which will be described later. The controller 28 estimates a trapping amount of the particulate matter trapped in the particulate matter removing filter 21 based upon an engine rotational speed N detected by the rotational sensor 23, a fuel injection quantity F injected by the fuel injection device 14, and a temperature of an exhaust gas (exhaust temperature) detected by the exhaust gas temperature sensor 26 which will be described later, and determines whether or not the regeneration treatment is executed based upon a first estimated trapping amount Q1 which is the estimated trapping amount. It should be noted that the fuel injection quantity F can be found from an intake air quantity detected from the air flow meter (not shown) provided in the intake side of the engine 10 and an engine rotational speed N, for example, and besides, can be calculated also from a control signal (fuel injection command) that is output to the fuel injection device 14 from the controller 28, for example.

The pressure sensors 24 and 25 are provided in the casing 19 in the exhaust gas purifying device 18. As shown in FIG. 3, the pressure sensors 24 and 25 are arranged at an inlet side (upstream side) and at an outlet side (downstream side) of the particulate matter removing filter 21 to be spaced from each other, and output the respective detection signals to the controller 28 which will be described later. The controller 28 calculates a differential pressure $\Delta P$ between a pressure P1 in an inlet side detected by the pressure sensor 24 and a pressure P2 in an outlet side detected by the pressure sensor 25, and estimates a trapping amount of the particulate matter trapped in the particulate matter removing filter 21 based upon the differential pressure $\Delta P$, an exhaust temperature, and an exhaust gas flow amount, and determines whether or not the regeneration treatment is executed based upon a second estimated trapping amount Q2 that is the estimated trapping amount.

The exhaust gas temperature sensor 26 detects a temperature of an exhaust gas (exhaust temperature). As shown in FIG. 3, the exhaust gas temperature sensor 26 is mounted to the casing 19 in the exhaust gas purifying device 18, and detects a temperature of an exhaust gas discharged from the side of the exhaust pipe 12, for example. The exhaust temperature detected by the exhaust gas temperature sensor 26 is output to the controller 28, which will be described later, as a detection signal. The exhaust temperature is used for estimating a trapping amount of the particulate matter trapped in the particulate matter removing filter 21.

The alarm 27 is provided near an operator's seat in the cab 8. The alarm 27 is connected to the controller 28, and gives an alarm that there is the malfunction in the regeneration device 22 or the engine 10 to an operator, based upon a command (alarm signal) from the controller 28. Here, the alarm 27 may be configured by a buzzer for generating an alarm sound, a speaker for generating sounds, a light or monitor for displaying an alarm content or the like. The alarm 27, in a case where the controller 28 determines that there is the malfunction (or the malfunction might possibly be caused), gives an alarm that there is the malfunction to an operator by generating an alarm sound or an alarm display based upon a command (alarm signal) from the controller 28.

The controller 28 comprises a microcomputer and the like, and the controller 28 is connected at the input side to the fuel injection device 14, the rotational sensor 23, the pressure sensors 24 and 25, the exhaust gas temperature sensor 26 and the like. The controller 28 is connected at the output side to the fuel injection device 14, the alarm 27 and the like. The controller 28 includes a memory section 28A comprising a ROM, a RAM and the like, and process programs for regeneration treatment and malfunction determination shown in FIG. 4 and FIG. 5 which will be described later, a first map and a second map in advance produced for estimating a trapping amount of particulate matter, calculation formulas, a preset trapping amount threshold value Qs, a predetermined value $\Delta Qs$, a predetermined time Ts, and the like are stored in the memory section 28A.

Here, the first map for estimating a trapping amount is a map for estimating the trapping amount based upon at least a rotational speed N of the engine 10 and a fuel injection quantity F. Specifically, the first map is a map that is produced based upon a corresponding relation between an engine rotational speed N, a fuel injection quantity F, and an emission amount of particulate matter, which is in advance found by experiments, calculations, simulations, and the like. The calculation formula for estimating the trapping amount can be expressed according to the following formula 1 in a case where an estimated trapping amount is indicated at Q1, an emission amount of the particulate matter found by the first map is indicated at Hm and an amount (regeneration amount) of particulate matter removed from the particulate matter removing filter 21 by the regeneration treatment is indicated at J.

$$Q1=Hm-J \qquad \text{[Formula 1]}$$

In this case, the amount of the particulate matter removed from the regeneration treatment, that is, the regeneration amount J can be calculated from, for example, a relation between a flow amount of an exhaust gas found by an engine rotational speed N and a fuel injection quantity F, an exhaust temperature, and a $NO_2$ conversion rate found by adding an exhaust temperature to an emission amount of nitrogen oxides (NOx) found by an engine rotational speed N and a fuel injection quantity F.

The second map for estimating a trapping amount is a map for estimating the trapping amount based upon at least a differential pressure $\Delta P$ across the particulate matter removing filter 21. Specifically, the second map is a map that is produced based upon, for example, a corresponding relation between the differential pressure $\Delta P$, an exhaust gas flow amount, and the estimated trapping amount Q2, which is in advance found by experiments, calculations, simulations, and the like. The differential pressure $\Delta P$ across the particulate matter removing filter 21 can be expressed according to the following formula 2 in a case where a pressure in an inlet-side detected by the pressure sensor 24 is indicated at P1 and a pressure in an outlet-side detected by the pressure sensor 25 is indicated at P2 (refer to Japanese Patent Laid-Open No. 2004-132358 A).

$$\Delta P=P1-P2 \qquad \text{[Formula 2]}$$

The trapping amount threshold value Qs is a reference value for determining whether or not the regeneration treatment is executed. That is, the trapping amount threshold value Qs is a threshold value for determining that the regeneration treatment is necessary when the first estimated trapping amount Q1 estimated by the first map and the calculation formula, and/or the second estimated trapping amount Q2 estimated by the second map is equal to or more than the trapping amount threshold value Qs. In other words, the trapping amount threshold value Qs is a determination value for determining whether or not the particulate matter trapped in the particulate matter removing filter 21 reaches a trapping amount for which the regeneration treatment of the filter 21 is necessary. Therefore, a value of the trapping amount threshold value Qs is in advance set based upon experiments, calculations, simulations and the like so that the regeneration treatment can be executed in an appropriate state, for example, in a state where a sufficient amount of the particulate matter is trapped in the particulate matter removing filter 21. Thereby, when a sufficient amount of the particulate matter is trapped in the particulate matter removing filter 21, the regeneration treatment can stably be executed by the regeneration device 22.

Next, description will be made of a relation between a predetermined value ΔQs and a predetermined time Ts by referring to FIG. 6. The predetermined value ΔQs and the predetermined time Ts are reference values for determining whether or not there is a malfunction in the regeneration device 22 or the engine 10. That is, the predetermined value ΔQs and the predetermined time Ts are values for determining that there is the malfunction in the regeneration device 22 when a difference (ΔQ=Q2−Q1) between the second estimated trapping amount Q2 and the first estimated trapping amount Q1 is equal to or more than a predetermined value (ΔQs) (for example, equal to or more than 4 [g/L]) and when a continuous time T in that state is equal to or more than a predetermined time Ts[Hr]. The values of the predetermined value ΔQs and the predetermined time Ts are in advance set based upon experiments, calculations, simulations and the like so that it is possible to appropriately determine that there is the malfunction or a possibility of the malfunction in the regeneration device 22 or the engine 10 due to use of fuel or engine oil of low quality or the like.

The controller 28 performs automatic regeneration control (first function) for automatically executing regeneration treatment according to process programs in FIG. 4 and FIG. 5 which will be described later, and, in a case where it is determined that there is the malfunction in the regeneration device 22 or the engine 10, performs malfunction determining control (second function) for giving the alarm that there is the malfunction to an operator.

First, description will be made of the automatic regeneration control that is the first function. The controller 28 estimates a trapping amount of particulate matter trapped in the particulate matter removing filter 21 based upon at least a fuel injection quantity F and an engine rotational speed N, and in addition thereto, also based upon at least a differential pressure ΔP across the particulate matter removing filter 21. Next, the controller 28 determines whether or not it is necessary to execute the regeneration treatment based upon whether or not at least one of the two estimated trapping amount, that is, a first estimated trapping amount Q1 estimated based upon at least a fuel injection quantity F and an engine rotational speed N, and a second estimated trapping amount Q2 based upon at least a differential pressure ΔP across the particulate matter removing filter 21 is equal to or more than a trapping amount threshold value Qs. Next, the controller 28 performs control of the automatic regeneration by outputting a control signal of performing post injection to the fuel injection device 14 in case it is determined that the regeneration treatment is necessary.

Next, description will be made of the malfunction determining control that is the second function. The controller 28 determines whether or not there is a malfunction in the regeneration device 22 or the engine 10 based upon a magnitude relation between the first estimated trapping amount Q1 and the second estimated trapping amount Q2. Specifically, in a case where the second estimated trapping amount Q2 is larger than the first estimated trapping amount Q1, the difference (Q2−Q1) is equal to or more than the predetermined value ΔQs [g/L], and the continuous time T in that state is equal to or more than the preset predetermined time Ts [Hr], it is determined that there is the malfunction in the regeneration device 22 or the engine 10. The controller 28, in case it is determined that there is the malfunction, outputs a signal (alarm signal) for giving an alarm of the malfunction to an operator to generate an alarm sound and an alarm display from the alarm 27, thus performing control of the malfunction alarm. In this case, for restricting the output of the engine 10 to be smaller than rated power, the controller 28 outputs a control signal of restricting a fuel injection quantity F or an engine rotational speed N to the fuel injection device 14 in the engine 10, for example.

It should be noted that a outlet port 29 is provided in the downstream side of the exhaust gas purifying device 18, and the outlet port 29 is connected to an outlet side of the casing 19 to be positioned downstream of the particulate matter removing filter 21. The outlet port 29 is configured by including a chimney pipe for releasing an exhaust gas subjected to purifying treatment to an atmosphere, and a muffler.

The hydraulic excavator 1 according to the first embodiment has the configuration as described above, and, next, an operation thereof will be explained.

An operator of the hydraulic excavator 1 gets on the cab of the upper revolving structure 4, and starts the engine 10 to drive the hydraulic pump 15. Thereby, pressurized oil from the hydraulic pump 15 is supplied through control valves to various actuators. When the operator having got on the cab 8 operates an operating lever for traveling, the lower traveling structure 2 can go forward or backward.

On the other hand, when the operator in the cab 8 operates an operating lever for working, the working mechanism 5 can be tilted to perform an excavating work of sand and earth or the like. In this case, since a revolving radius by the upper revolving structure 4 is small, the small-sized hydraulic excavator 1 can perform a gutter digging work while revolving the upper revolving structure 4 even in a narrow working site such as an urban area.

At the operating of the engine 10, the particulate matter that are harmful substances is discharged from the exhaust pipe 12. At this time, the exhaust gas purifying device 18 can oxidize and remove hydrocarbon (HC), nitrogen oxides (NO), and carbon monoxides (CO) in an exhaust gas by the oxidation catalyst 20. The particulate matter removing filter 21 traps the particulate matter contained in the exhaust gas. Thereby, the purified exhaust gas can be discharged through the downstream outlet port 29 to an outside. Further, the trapped particulate matter is burned and removed (is subjected to regeneration treatment) by the regeneration device 22.

Incidentally, when, as fuel of the engine 10 or engine oil, fuel or engine oil of low quality, for example, low-quality fuel or low-quality oil that contains a large deal of sulfur contents, additives, and ashes that cannot be burned or removed by the regeneration treatment is used, an emission amount of the particulate matter increases, creating a possibility of increasing the frequency of the regeneration treatment or leading to deterioration in performance or durability of the engine 10 or the regeneration device 22.

Therefore, in the first embodiment, the controller 28 of the regeneration device 22 performs the control of the regeneration treatment, and further, determines that there is the malfunction in the regeneration device 22 or the engine 10 due to use of fuel or oil of low quality, from the first estimated trapping amount Q1 and the second estimated trapping amount Q2 used for determination on whether or not the regeneration treatment is executed. Specifically, the processes shown in FIG. 4 and FIG. 5 are executed by the controller 28 to execute the regeneration treatment and the malfunction determining process.

First, by referring to FIG. 4, the estimation process of the first estimated trapping amount Q1 the estimation process of the second estimated trapping amount Q2 and the regeneration treatment will be described.

Figure 4:
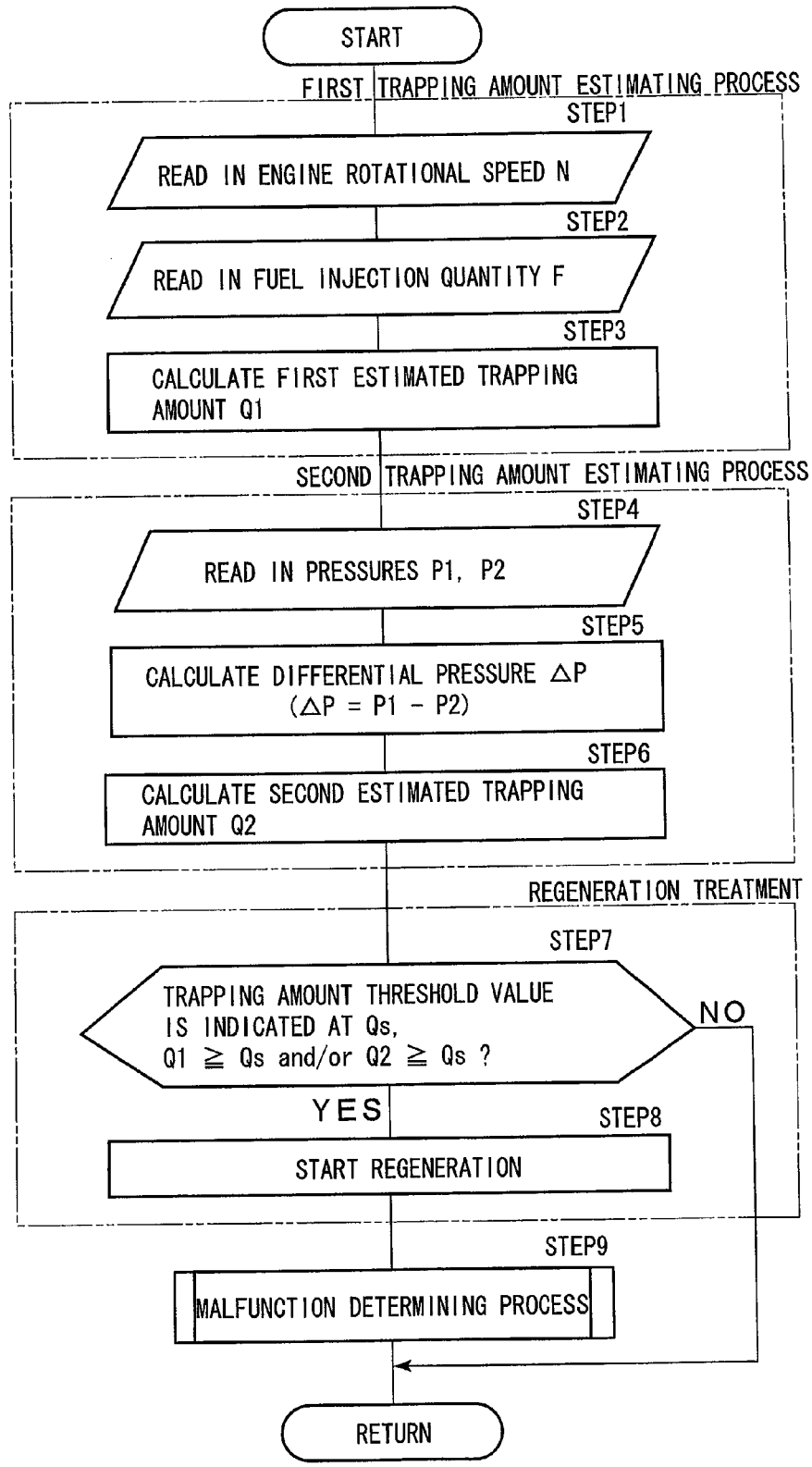
FIG. 4 is a flow chart showing regeneration treatment of a particulate matter removing filter by the regeneration device.

When the process operation in FIG. 4 starts by a start (a work) of the engine 10, at step 1, an engine rotational speed N is read in from the rotational sensor 23. Next, at step 2, a fuel injection quantity F injected from the fuel injection device 14 is read in. It should be noted that the fuel injection quantity F can be found by, for example, an intake air quantity detected from the air flowmeter (not shown) that is provided in the intake side of the engine 10 and an engine rotational speed N, and besides, can also be calculated from, for example, a control signal (fuel injection command) that is output to the fuel injection device 14 from the controller 28. At step 3, a trapping amount of particulate matter trapped in the particulate matter removing filter 21, that is, the first estimated trapping amount Q1 is estimated (calculated) based upon an engine rotational speed N and a fuel injection quantity F. The first estimated trapping amount Q1 can be estimated using the first map and the calculation formula stored in the memory section 28A in the controller 28.

That is, an emission amount per unit time is found using the aforementioned first map from the engine rotational speed N and the fuel injection quantity F, and a total emission amount Hm from the operating start until the present time is found by integrating the emission amount. The first estimated trapping amount Q1 at the present time can be estimated by subtracting an amount (regeneration amount) J of particulate matter that has been removed by the regeneration treatment until the present time from the total emission amount Hm based upon the aforementioned formula 1.

At next step 4 pressures P1 and P2 are respectively read in from the pressure sensors 24 and 25. That is, the upstream pressure P1 and the downstream pressure P2 across the particulate matter removing filter 21 are read in. At next step 5 a differential pressure ΔP between the upstream pressure P1 and the downstream pressure P2 across the particulate matter removing filter 21 is calculated from the aforementioned formula 2.

At next step 6 a trapping amount of particulate matter trapped in the particulate matter removing filter 21, that is, the second estimated trapping amount Q2 is estimated (calculated) based upon the differential pressure ΔP. The second estimated trapping amount Q2 can be estimated using the aforementioned second map stored in the memory section 28A in the controller 28. That is, the second estimated trapping amount Q2 at the present time can be estimated based upon the second map in which the differential pressure ΔP, the exhaust gas flow amount and the estimated trapping amount Q2 are associated with each other.

At next step 7 a determination on whether or not the regeneration treatment is executed is made based upon whether or not the first estimated trapping amount Q1 and/or the second estimated trapping amount Q2 is equal to or more than a preset trapping amount threshold value Qs. In a case where at step 7, the determination of "YES" is made, that is, it is determined that at least one of the first estimated trapping amount Q1 and the second estimated trapping amount Q2 is equal to or more than the trapping amount threshold value Qs, the particulate matter is sufficiently trapped in the particulate matter removing filter 21. Therefore, the routine goes to step 8, wherein the automatic regeneration starts. That is, at step 8, the controller 28 outputs a control signal for performing post injection to the fuel injection device 14. This post injection increases a temperature of an exhaust gas from the engine 10 to burn and remove the particulate matter trapped (accumulated) in the particulate matter removing filter 21. Then, the routine goes to the malfunction determining process at step 9 which will be described later.

On the other hand, in a case where at step 7, the determination of "NO" is made, that is, it is determined that both of the first estimated trapping amount Q1 and the second estimated trapping amount Q2 are smaller than the trapping amount threshold value Qs, the particulate matter is not sufficiently trapped in the particulate matter removing filter 21. Therefore, the routine goes to "Return" not through step 8 and step 9, and, therefore, the steps beginning with the step 1 are repeated.

Figure 6:
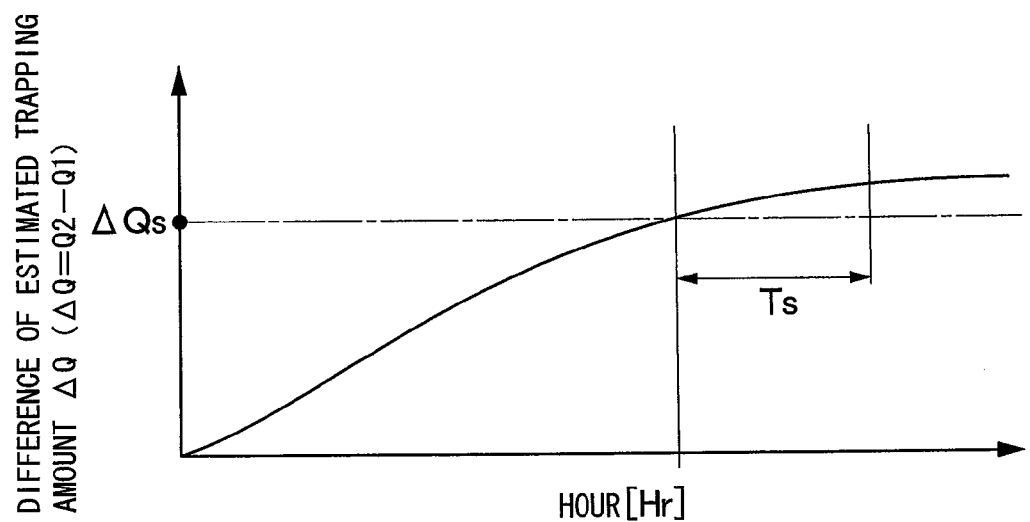
FIG. 6 is a characteristic line diagram showing an example of a change in a difference ΔQ between a first estimated trapping amount and a second estimated trapping amount with time.

Next, the malfunction determining process shown at step 9 in FIG. 4 will specifically be explained by referring to FIG. 6.

At step 9, the first estimated trapping amount Q1 estimated at step 3 and the second estimated trapping amount Q2 estimated at step 6 are used to execute the malfunction determining process on whether or not there is a malfunction in the regeneration device 22 or the engine 10. The malfunction determining process, as shown in FIG. 5, makes a determination on whether or not there is the malfunction in the regeneration device 22 or the engine 10, and, in a case where it is determined that there is the malfunction, gives the alarm that there is the malfunction to an operator, and executes the process of restricting the output of the engine 10 to be smaller than rated power.

That is, at step 11 of the malfunction determining process, it is determined whether or not the second estimated trapping amount Q2 estimated at step 6 is larger than the first estimated trapping amount Q1 estimated at step 3 (Q1<Q2). In a case where at step 11, a determination of "NO" is made, that is, it is determined that the second estimated trapping amount Q2 is equal to or less than the first estimated trapping amount Q1, since a deviation between the first estimated trapping amount Q1 and the second estimated trapping amount Q2 due to use of fuel or engine oil of low quality does not occur, the routine goes to step 12, wherein it is determined that there is no malfunction. In this case, the routine goes back to "Start" in FIG. 4 and, therefore, the steps beginning with the step 1 are repeated.

On the other hand, in a case where at step 11, a determination of "YES" is made, that is, it is determined that the second estimated trapping Q2 is larger than the first estimated trapping amount Q1, the routine goes to step 13, wherein it is determined whether or not a difference (ΔQ=Q2−Q1) between the second estimated trapping amount Q2 and the first estimated trapping amount Q1 is equal to or more than a preset predetermined value ΔQs (ΔQ≥ΔQs). In a case where at step 13, a determination of "NO" is made, that is, it is determined that the difference ΔQ between the second estimated trapping amount Q2 and the first estimated trapping amount Q1 is smaller than the predetermined value ΔQs, for example, since it is estimated that there is a high possibility that a micro small deviation of the trapping amount has occurred due to an accuracy error of the rotational sensor 23, or the pressure sensors 24 or 25, the routine goes to step 12, wherein it is determined that there is no malfunction. In this case, the routine goes back to "Start" in FIG. 4, and, therefore, the steps beginning with the step 1 are repeated.

On the other hand, in a case where at step 11, a determination of "YES" is made, that is, it is determined that the difference ΔQ between the second estimated trapping amount Q2 and the first estimated trapping amount Q1 is equal to or more than the predetermined value ΔQs, the routine goes to step 14. At step 14, it is determined whether or not a continuous time T of a state where the difference ΔQ between the second estimated trapping amount Q2 and the first estimated trapping amount Q1 is equal to or more than the predetermined value ΔQs is equal to or more than a preset predetermined time Ts (T≥Ts). That is, as shown in FIG. 6, it is determined whether or not the state where the difference ΔQ between the second estimated trapping amount Q2 and the first estimated trapping amount Q1 is equal to or more than the predetermined value ΔQs lasts for the preset predetermined time Ts.

In a case where at step 14, a determination of "NO" is made, that is, it is determined that the continuous time T is smaller than the predetermined time Ts, since it is estimated that there is a high possibility that a temporal deviation of the trapping amount has occurred due to an accuracy error of the rotational sensor 23, the pressure sensors 24 or 25, or the like, for example, the routine goes to step 12, wherein it is determined that there is no malfunction. In this case also, the routine goes back to "Start" in FIG. 4 and, therefore, the steps beginning with the step 1 are repeated.

On the other hand, in a case where at step 14, the determination of "YES" is made, that is, it is determined that the continuous time T is equal to or more than the predetermined time Ts, since it is estimated that there is the malfunction in the regeneration device 22 or the engine 10 due to use of fuel or engine oil of low quality or the like, the routine goes to step 15, wherein it is determined that there is the malfunction. At next step 16, the alarm that there is the malfunction is given to an operator. Specifically, the controller 28 outputs an alarm signal for generating an alarm sound and an alarm display to the alarm 27 to give the alarm that there is the malfunction to the operator.

At next step 17 the output of the engine 10 is restricted to be smaller than rated power. That is, the controller 28 outputs a control signal to the fuel injection device 14 for restricting a fuel injection quantity F or an engine rotational speed N more than in a case where there is no malfunction. After that, the routine goes back to "Start" in FIG. 4 and, therefore, the steps beginning with the step 1 are repeated.

Thus, according to the first embodiment, it is possible to prevent durability of the particulate matter removing filter 21 or the engine 10 from being deteriorated due to use of fuel or engine oil of low quality. Thereby, it is possible to improve reliability and stability of the hydraulic excavator 1.

That is, when the second estimated trapping amount Q2 estimate at step 6 is larger than the first estimated trapping amount Q1 estimated at step 3 due to use of engine oil or fuel of low quality, it is possible to determine whether or not there is the malfunction by the processes at step 13 and step 14. In a case where it is determined that there is the malfunction, necessary maintenance or repair such as replacement of engine oil or the fuel can be performed to prevent durability of the particulate matter removing filter 21 or the engine 10 from being deteriorated. Thereby, reliability and stability of the hydraulic excavator 1 can be improved.

According to the first embodiment, the determination on the malfunction can be made by the processes at step 13 and step 14, based upon the difference ΔQ between the first estimated trapping amount Q1 and the second estimated trapping amount Q2, and the continuous time T of the state where the difference ΔQ is equal to or more than the predetermined value ΔQs. Therefore, in a case of accuracy errors, erroneous operations or the like of the rotational sensor 23 and the pressure sensors 24 and 25, it is possible to restrict the determination that there is the malfunction in the particulate matter removing filter 21 or the engine 10 to stably perform the determination on the malfunction.

According to the first embodiment, in a case where at step 15, it is determined that there is the malfunction, at step 16, the alarm that there is the malfunction is given to an operator. Therefore, the operator or a maintenance-responsible person can perform maintenance or repair of the hydraulic excavator 1 in response to the alarm. This prevents durability of the particulate matter removing filter 21 or the engine 10 from being deteriorated or the excessive malfunction thereof from occurring.

According to the first embodiment, the output of the engine 10 is restricted to be smaller than the rated power at step 17 subsequent to step 16. Therefore, in a state where fuel or engine oil of low quality is used, it is possible to restrict large loads from being applied to the engine 10. As a result, it is possible to prevent deterioration in durability and the excessive malfunction of the engine 10 or the particulate matter removing filter 21.

Figure 7:
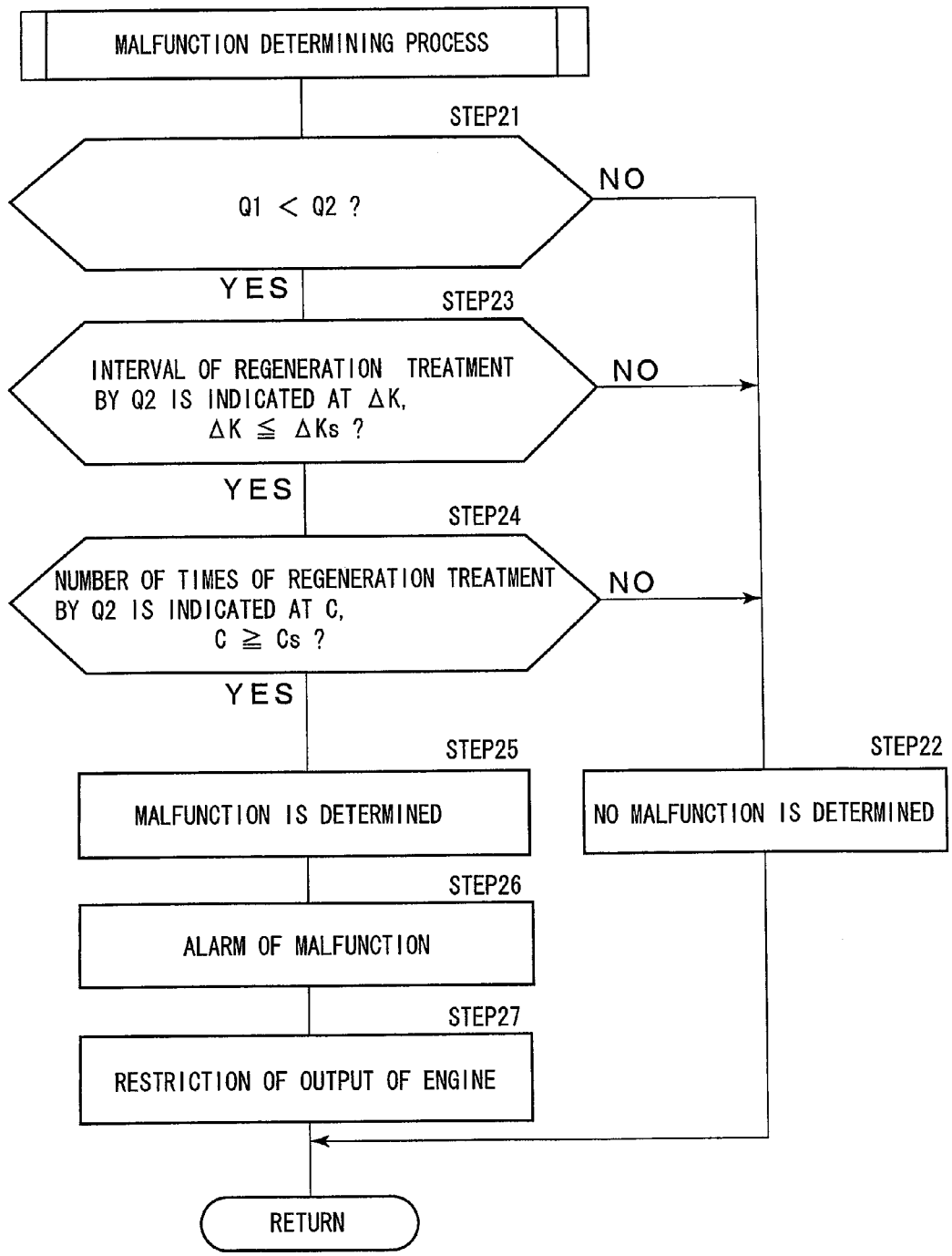
FIG. 7 is a flow chart showing a malfunction determining process according to a second embodiment in the present invention.
Figure 8:
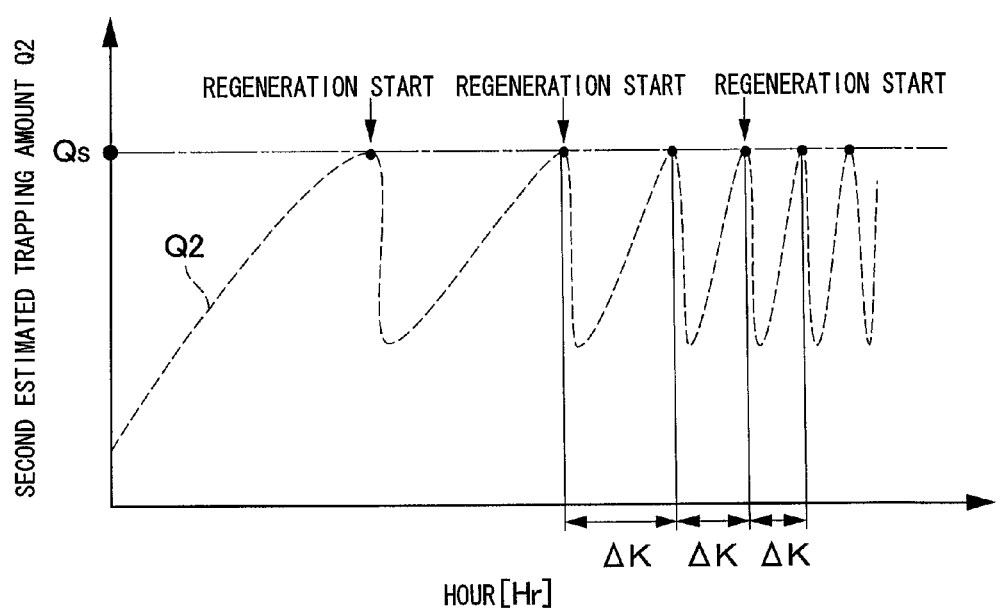
FIG. 8 is a characteristic line diagram showing an example of a change in a second estimated trapping amount Q2 with time.

Next, FIG. 7 and FIG. 8 show a second embodiment in the present invention. The second embodiment is characterized in that a determination on the malfunction can be made based upon an interval ΔK of the regeneration treatment and the number of times C thereof. It should be noted that in the second embodiment, component elements that are identical to those in the foregoing first embodiment will be simply denoted by the same reference numerals to avoid repetitions of similar explanations.

Figure 5:
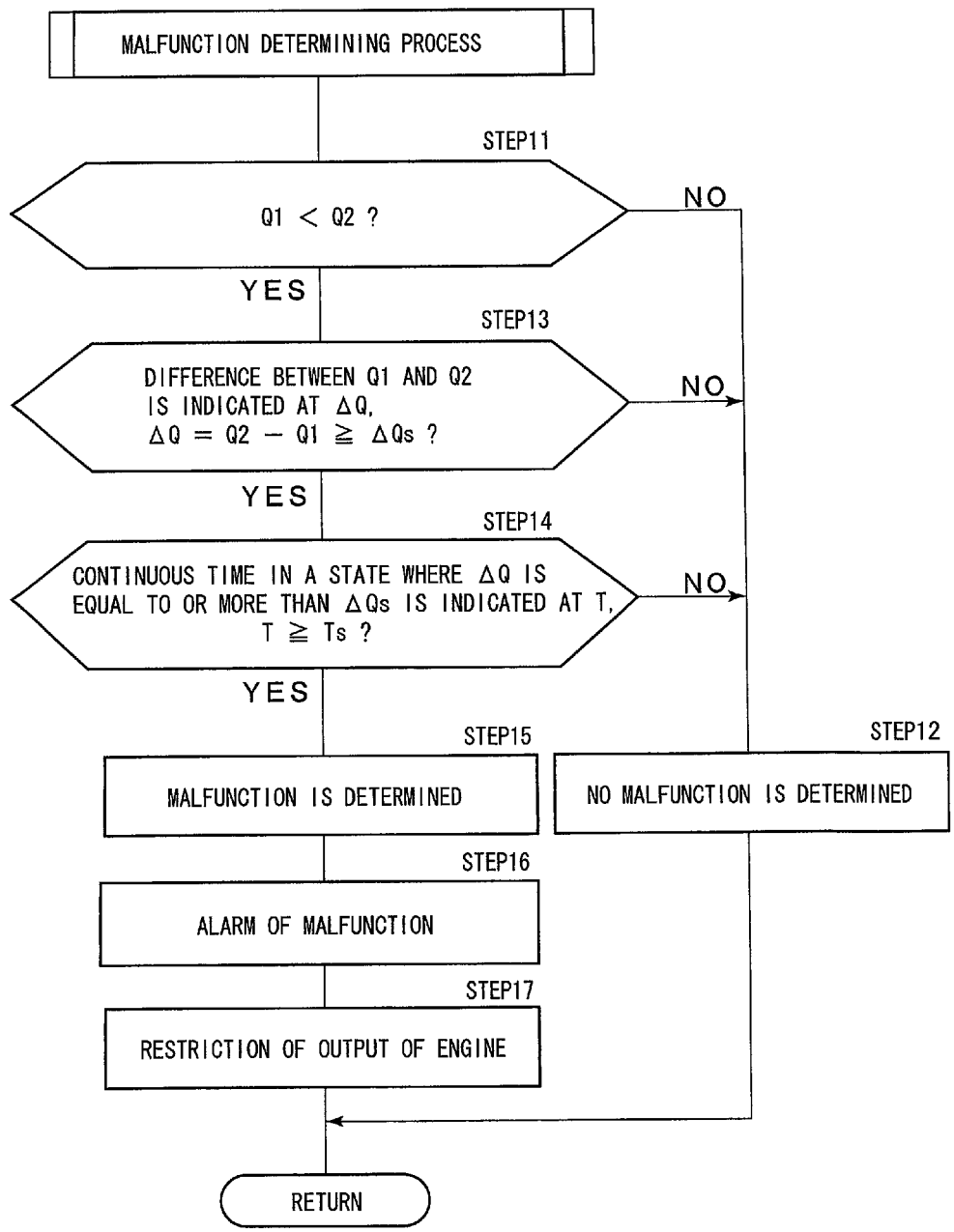
FIG. 5 is a flow chart showing a malfunction determining process in FIG. 4.

A malfunction determining process shown in FIG. 7 is used in the second embodiment in place of the malfunction determining process in FIG. 5 in the first embodiment. Therefore, the process shown in FIG. 4 as described above and the malfunction determining process shown in FIG. 7 are stored as process programs for regeneration treatment and malfunction determination in the memory section 28A in the controller 28. A predetermined time ΔKs and a predetermined number of times Cs are stored in the memory section 28A in the controller 28 in place of the predetermined value ΔQs and the predetermined time Ts stored in the aforementioned first embodiment.

As will be described by referring to FIG. 8, the predetermined time ΔKs and the predetermined number of times Cs are threshold values for determining whether or not there is a malfunction in the regeneration device 22 or the engine 10. That is, the predetermined time ΔKs and the predetermined number of times Cs are determination values for determining that there is the malfunction in the regeneration device 22 when an interval ΔK of the regeneration treatment executed and the second estimated trapping amount Q2 is equal to or more than the trapping amount threshold value Qs becomes within the predetermined time ΔKs [Hr] and the number of times C by which the regeneration treatment is executed in that state reaches a predetermined number of times Cs. The values of the predetermined time ΔKs and the predetermined number of times Cs are in advance set based upon experiments, calculations, simulations and the like so that it is possible to appropriately determine that there is the malfunction or a possibility of the malfunction in the regeneration device 22 or the engine 10 due to use of fuel or engine oil of low quality or the like.

The malfunction determining process according to the second embodiment is also a process for determining whether or not there is the malfunction in the regeneration device 22 or the engine 10 by using the first estimated trapping amount Q1 estimated at step 3 and the second estimated trapping amount Q2 estimated at step 6. In a case where it is determined that there is the malfunction, the alarm that there is the malfunction is given to an operator and the process of restricting the output of the engine 10 to be smaller than in a case where there is no malfunction is executed.

That is, at step 21, as similar to step 11 in the first embodiment, it is determined whether or not the second estimated trapping amount Q2 is larger than the first estimated trapping amount Q1 (Q1<Q2). In a case where at step 21, a determination of "YES" is made, that is, it is determined that the second estimated trapping amount Q2 is larger than the first estimated trapping amount Q1, the routine goes to step 23, wherein it is determined whether or not the interval ΔK of the regeneration treatment executed when the second estimated trapping amount Q2 is equal to or more than the trapping amount threshold value Qs becomes within a preset predetermined time ΔKs (ΔK≤ΔKs). That is, as shown in FIG. 7, when fuel or engine oil of low quality is used, an emission amount of particulate matter increases, which increases frequency of the regeneration treatment executed in a case where the second estimated trapping amount Q2 is larger than the trapping amount threshold value Qs. Therefore, at step 23, it is determined whether or not the interval ΔK of the regeneration treatment is within the predetermined time ΔKs.

In a case where at such step 23, a determination of "YES" is made, that is, it is determined that the interval ΔK of the regeneration treatment is within the predetermined time ΔKs, the routine goes to step 24, wherein it is determined whether or not the number of times C by which the regeneration treatment is executed by the interval ΔK within the predetermined time ΔKs reaches a predetermined number of times Cs (C≥Cs). In a case where at step 24, the determination of "YES" is made, that is, it is determined that the regeneration treatment is executed by the interval ΔK within the predetermined time ΔKs by the predetermined number of times Cs, since it is estimated that there is the malfunction in the regeneration device 22 or the engine 10 due to use of fuel or engine oil of low quality or the like, the routine goes to step 25, wherein it is determined that there is the malfunction.

It should be noted that the processes other than step 23 and step 24, that is, the processes of steps 21, 22, 25, 26 and 27 are respectively similar to the processes of steps 11, 12, 15, 16 and 17 shown in FIG. 5 in the first embodiment. Therefore, the further explanation is omitted.

The second embodiment makes the determination on the malfunction based upon the interval ΔK and the number of times C of the regeneration treatment by the malfunction determining process shown in FIG. 7 as described above, and a basic function thereof does not particularly differ from that of the first embodiment as described above.

Particularly, in a case of the second embodiment, the determination on the malfunction is made by step 23 and step 24, based upon the interval ΔK and the number of times C of the regeneration treatment executed when the second estimated trapping amount Q2 is equal to or more than the trapping amount threshold value Qs. Therefore, the determination on the malfunction due to use of fuel or engine oil of low quality can stably be made.

Figure 9:
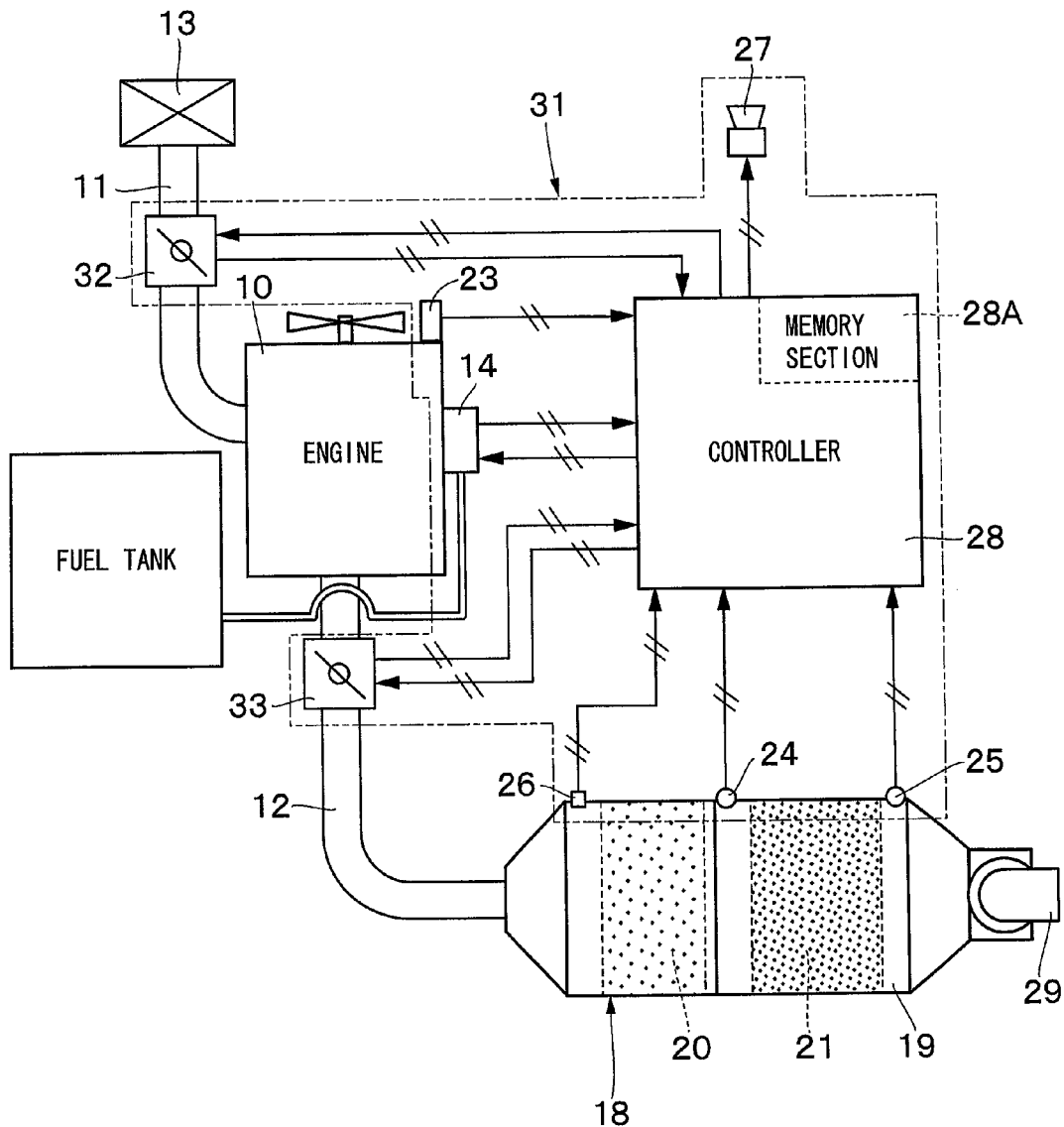
FIG. 9 is a circuit configuration diagram showing an engine, an exhaust gas purifying device, a regeneration device, and the like according to a third embodiment in the present invention, which is similar to that in FIG. 3.

Next, FIG. 9 shows a third embodiment in the present invention. The third embodiment is characterized by executing regeneration treatment, not by post injection, but by driving at least one of an intake throttle valve provided in an intake side of an engine and an exhaust throttle valve provided in an exhaust side thereof in a direction of throttling a flow passage thereof. It should be noted that in the third embodiment, component elements that are identical to those in the foregoing first embodiment will be simply denoted by the same reference numerals to avoid repetitions of similar explanations.

In the figure, designated at 31 is a regeneration device for executing the regeneration treatment of the particulate matter removing filter 21 by burning the particulate matter trapped in the particulate matter removing filter 21. The regeneration device 31 is configured by including the fuel injection device 14, an intake throttle valve 32, an exhaust throttle valve 33, the rotational sensor 23, the pressure sensors 24 and 25, the exhaust gas temperature sensor 26, the alarm 27, and the controller 28. The regeneration device 31, at the time of executing the regeneration treatment, operates at least one of the intake throttle valve 32 and the exhaust throttle valve 33 in a direction of throttling a flow passage thereof to burn and remove the particulate matter accumulated in the filter 21.

The intake throttle valve 32 is provided in the side of the intake pipe 11 of the engine 10, and forms part of the regeneration device 31 for executing the regeneration treatment of the particulate matter removing filter 21. Here, the intake throttle valve 32 is regularly held in an opened state in response to a control signal from the controller 28 (for example, in an opening degree corresponding to a fuel injection quantity F or in a fully opened state). On the other hand, at the time of executing the regeneration treatment, the intake throttle valve 32 is operated in the direction of throttling the flow passage by the control signal from the controller 28.

Thereby, the intake throttle valve 32 throttles an intake air quantity such that an air-fuel ratio of air and fuel becomes in a richer side. At this time, a temperature of an exhaust gas discharged to the side of the exhaust pipe 12 rises in a combustion chamber in the engine 10 by burning the fuel the air-fuel ratio of which has become in the richer side, thus making it possible to burn and remove the particulate matter trapped in the filter 21.

The exhaust throttle valve 33 is provided in the side of the exhaust pipe 12 of the engine 10, and the exhaust throttle valve 33 also forms part of the regeneration device 31 for executing the regeneration treatment of the particulate matter removing filter 21. Here, the exhaust throttle valve 33 is regularly held in a fully opened state in response to a control signal from the controller 28. On the other hand, at the time of executing the regeneration treatment, the exhaust throttle valve 33 is operated in the direction of throttling the flow passage in response to the control signal from the controller 28 to perform control of throttling the opening degree to be smaller.

Thereby, the exhaust throttle valve 33 throttles a flow amount of an exhaust gas flowing in the exhaust pipe 12 to apply a back pressure to the engine 10 and increase loads to the engine 10. At this time, the controller 28 increases a fuel injection quantity F by the fuel injection device 14 of the engine 10 corresponding to the above-mentioned load. As a result, a temperature of the exhaust gas rises, thereby making it possible to burn and remove the particulate matter trapped in the filter 21.

The third embodiment executes the regeneration treatment by driving at least one of the intake throttle valve 32 and the exhaust throttle valve 33 as describe above in the direction of throttling the flow passage, and does not particularly differ in the basic function from the aforementioned first embodiment.

Particularly, in a case of the third embodiment, since the regeneration treatment is executed by operating at least one of the intake throttle valve 32 and the exhaust throttle valve 33 in the direction of throttling the flow passage, the regeneration treatment can be executed at a lower temperature as compared to a case of executing the regeneration treatment by the post injection. Thereby, durability of the filter 21 can be improved.

Figure 10:
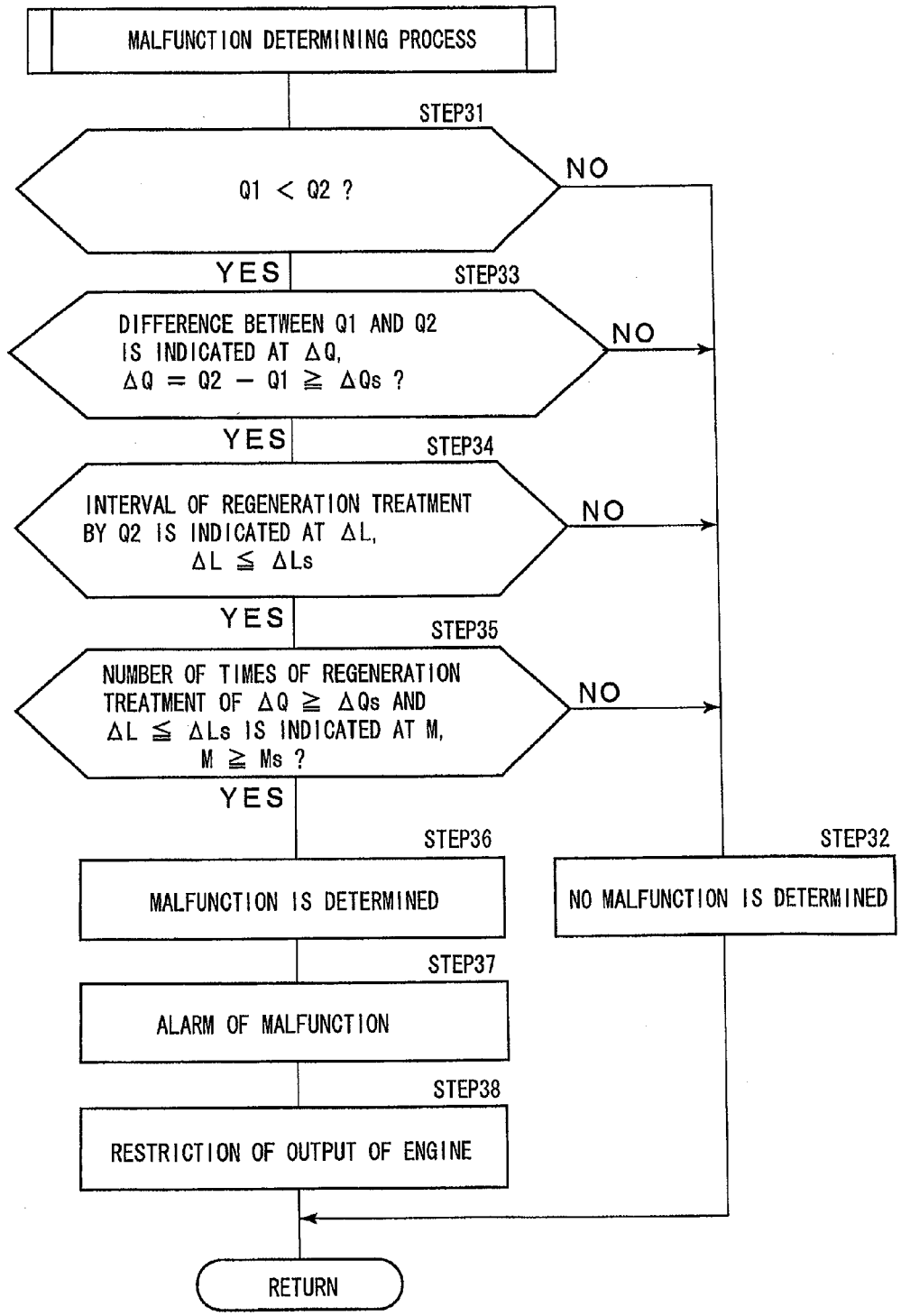
FIG. 10 is a flow chart showing a malfunction determining process according to a fourth embodiment in the present invention.
Figure 11:
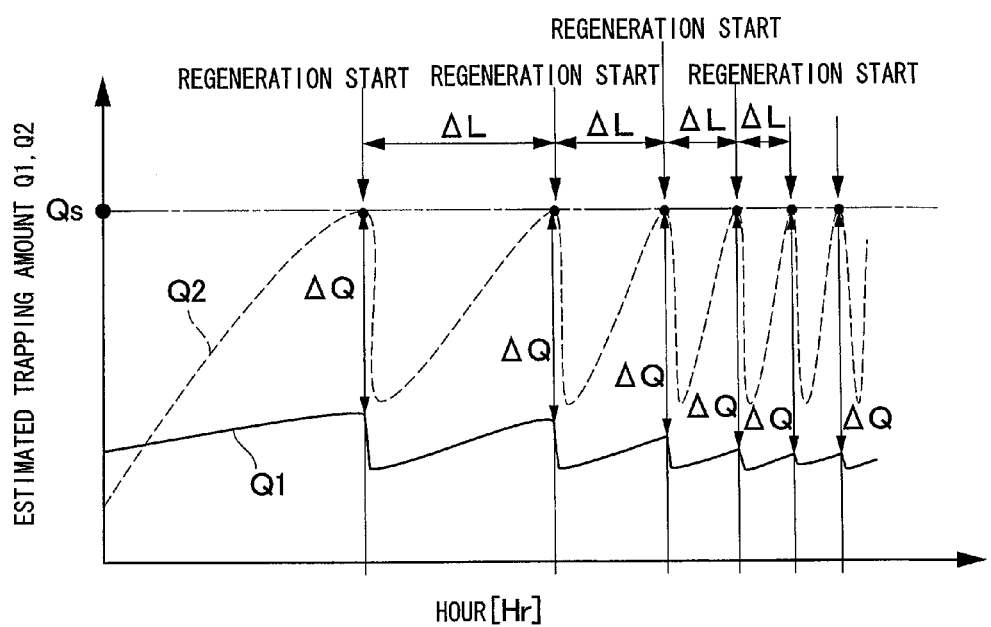
FIG. 11 is a characteristic line diagram showing an example of a change in a first estimated trapping amount and a second estimated trapping amount with time.

Next, FIG. 10 and FIG. 11 show a fourth embodiment in the present invention. The fourth embodiment is characterized by making a determination on the malfunction based upon a difference ($\Delta Q = Q2-Q1$) between a first estimated trapping amount (Q1) and a second estimated trapping amount (Q2), an interval ($\Delta L$) of the regeneration treatment executed in a state where the difference ($\Delta Q$) is equal to or more than a predetermined value ($\Delta Qs$), and the number of times (M) of the regeneration treatment. It should be noted that in the fourth embodiment, component elements that are identical to those in the foregoing first embodiment will be simply denoted by the same reference numerals to avoid repetitions of similar explanations.

A malfunction determining process shown in FIG. 10 is used in the fourth embodiment in place of the malfunction determining process in FIG. 5 in the first embodiment. Therefore, the process shown in FIG. 4 as described above and the malfunction determining process shown in FIG. 10 are stored as process programs for regeneration treatment and malfunction determination in the memory section 28A in the controller 28. A predetermined time $\Delta Ls$ and a predetermined number of times Ms are stored in the memory section 28A in the controller 28 in addition to the predetermined value $\Delta Qs$ stored in the aforementioned first embodiment.

As will be described by referring to FIG. 11, the predetermined value $\Delta Qs$, the predetermined time $\Delta Ls$ and the predetermined number of times Ms are threshold values for determining whether or not there is a malfunction in the regeneration device 22 or the engine 10. That is, the predetermined value $\Delta Qs$, as similar to the first embodiment, is a determination value used for determining whether or not the difference ($\Delta Q = Q2-Q1$) between the second estimated trapping amount Q2 and the first estimated trapping amount Q1 is equal to or more than the predetermined value $\Delta Qs$ (for example, 4 [g/L]). The predetermined time $\Delta Ls$ is a determination value for determining whether or not an interval $\Delta L$ of the regeneration treatment, which is executed in a state where the difference ($\Delta Q = Q2-Q1$) between the second estimated trapping amount Q2 and the first estimated trapping amount Q1 is equal to or more than the predetermined value $\Delta Qs$, that is, when the second estimated trapping amount Q2 reaches Qs or more, becomes within the predetermined time $\Delta Ls$ [Hr]. The predetermined number of times Ms is a determination value for determining whether or not the number of times M of the regeneration treatment executed by the interval $\Delta L$ within the predetermined time $\Delta Ls$ [Hr] reaches the predetermined number of times Ms.

In the fourth embodiment, in a case where the difference ($\Delta Q = Q2-Q1$) between the second estimated trapping amount Q2 and the first estimated trapping amount Q1 is equal to or more than the predetermined value $\Delta Qs$, the interval $\Delta L$ of the regeneration treatment, which is executed when the second estimated trapping amount Q2 reaches Qs or more in this state, is within the predetermined time $\Delta Ls$, and the number of times M of the regeneration treatment executed by the interval $\Delta L$ within the predetermined time $\Delta Ls$ reaches the predetermined number of times Ms, it is determined that there is the malfunction in the regeneration device 22. The values of the predetermined value $\Delta Qs$, the predetermined time $\Delta Ls$ and the predetermined number of times Ms are in advance set based upon experiments, calculations, simulations and the like so that it is possible to appropriately determine that there is the malfunction or a possibility of the malfunction in the regeneration device 22 or the engine 10 due to use of fuel or engine oil of low quality or the like.

The malfunction determining process according to the fourth embodiment is also a process for determining whether or not there is a malfunction in the regeneration device 22 or the engine 10 by using the first estimated trapping amount Q1 estimated at step 3 and the second estimated trapping amount Q2 estimated at step 6. In a case where it is determined that there is the malfunction, the alarm that there is the malfunction is given to an operator, and the process of restricting the output of the engine 10 to be smaller than in a case where there is no malfunction is executed.

That is, at step 31, as similar to step 11 in the first embodiment, it is determined whether or not the second estimated trapping amount Q2 is larger than the first estimated trapping amount Q1 (Q1<Q2). In a case where at step 31, a determination of "YES" is made, that is, it is determined that the second estimated trapping amount Q2 is larger than the first estimated trapping amount Q1, the routine goes to step 33, wherein, as similar to step 13 in the first embodiment, it is determined whether or not the difference ($\Delta Q = Q2-Q1$) between the second estimated trapping amount Q2 and the first estimated trapping amount Q1 is equal to or more than the preset predetermined value $\Delta Qs$ ($\Delta Q \geq \Delta Qs$).

In a case where at step 33, a determination of "YES" is made, that is, it is determined that the difference $\Delta Q$ between the second estimated trapping amount Q2 and the first estimated trapping amount Q1 is equal to or more than the predetermined value $\Delta Qs$, the routine goes to step 34. At step 34, it is determined whether or not the interval $\Delta L$ of the regeneration treatment executed in a state where the difference $\Delta Q$ between the second estimated trapping amount Q2 and the first estimated trapping amount Q1 is equal to or more than the predetermined value $\Delta Qs$ is within the preset predetermined time $\Delta Ls$ ($\Delta L \leq \Delta Ls$). That is, as shown in FIG. 11, when fuel or engine oil of low quality is used, an emission amount of particulate matter increases to increase frequency of the regeneration treatment executed in a state where the difference $\Delta Q$ between the second estimated trapping amount Q2 and the first estimated trapping amount Q1 is equal to or more than the predetermined value $\Delta Qs$. Therefore, at step 34, it is determined whether or not the interval $\Delta L$ of the regeneration treatment is within the predetermined time $\Delta Ls$.

In a case where at such step 34, a determination of "YES" is made, that is, it is determined that the interval $\Delta L$ of the regeneration treatment is within the predetermined time $\Delta Ls$, the routine goes to step 35, wherein it is determined whether or not the number of times M by which the regeneration treatment is executed by the interval $\Delta L$ within the predetermined time $\Delta Ls$ reaches the predetermined number of times Ms (M≥Ms). In a case where at step 35, a determination of "YES" is made, that is, it is determined that the regeneration treatment is executed by the interval $\Delta L$ within the predetermined time $\Delta Ls$ by the predetermined number of times Ms, since it is estimated that there is the malfunction in the regeneration device 22 or the engine 10 due to use of fuel or engine oil of low quality or the like, the routine goes to step 36, wherein it is determined that there is the malfunction.

It should be noted that the processes other than step 34 and step 35, that is, the processes of steps 31, 32, 33, 36, 37, and 38 are respectively similar to the processes of steps 11, 12, 13, 15, 16 and 17 shown in FIG. 5 in the first embodiment, therefore, the further explanation is omitted.

The fourth embodiment makes the determination on the malfunction based upon the interval ΔL and the number of times M of the regeneration treatment executed in a state where the difference ΔQ between the second estimated trapping amount Q2 and the first estimated trapping amount Q1 is equal to or more than the predetermined value ΔQs by the malfunction determining process shown in FIG. 10 as described above, and a basic function thereof does not particularly differ from that of the first embodiment as described above.

Particularly, in a case of the fourth embodiment, the determination on the malfunction is made by the processes of steps 33, 34 and 35, based upon the difference (ΔQ=Q2−Q1) between the second estimated trapping amount Q2 and the first estimated trapping amount Q1, the interval ΔL of the regeneration treatment and the number of times M of the regeneration treatment. Therefore, the determination on the malfunction due to use of fuel or engine oil of low quality can more stably be made.

It should be noted that in each of the aforementioned embodiments, the process at step 3 shown in FIG. 4 is a concrete example of a first trapping amount estimating unit that is a required element in the present invention, the process at step 6 likewise is a concrete example of a second trapping amount estimating unit, and the process at step 7 likewise is a concrete example of a regeneration determining unit. On the other hand, the processes of steps 11 to 15 shown in FIG. 5, the processes of steps 21 to 25 shown in FIG. 7, and the processes of steps 31 to 36 shown in FIG. 10 are concrete examples of a malfunction determining unit that is a required element in the present invention.

Each of the aforementioned embodiments is explained by taking a case where the exhaust gas purifying device 18 is configured by the oxidation catalyst 20 and the particulate matter removing filter 21 as an example. However, the present invention is not limited to the same, and may be configured by combining a urea injection valve, a selective reduction catalyst device and the like in addition to the oxidation catalyst and the particulate matter removing filter, for example.

Further, each of the aforementioned embodiments is explained by taking a case where the exhaust gas purifying device 18 is mounted on the small-sized hydraulic excavator 1 as an example. However, the construction machine provided with the exhaust gas purifying device according to the present invention is not limited to the same, and the exhaust gas purifying device may be applied to a middle-sized or larger-sized hydraulic excavator. In addition, the exhaust gas purifying device 18 may widely be applied also to a construction machine such as a hydraulic excavator, a wheel loader, a fork lift, and a hydraulic crane that are provided with a wheel type lower traveling structure.

DESCRIPTION OF REFERENCE NUMERALS

1: Hydraulic excavator (Construction machine)
2: Lower traveling structure (Vehicle body)
4: Upper revolving structure (Vehicle body)
10: Engine
14: Fuel injection device
18: Exhaust gas purifying device
21: Particulate matter removing filter (Filter)
22, 31: Regeneration device
24, 25: Pressure sensor
27: Alarm
28: Controller

The invention claimed is:

1. A construction machine comprising:
an automotive vehicle body;
an engine that is mounted on the vehicle body;
an exhaust gas purifying device that is provided in an exhaust side of the engine and includes a filter for trapping particulate matter in an exhaust gas discharged from the engine; and
a regeneration device that includes a microcomputer and memory, where the memory stores instructions that, when executed by the microcomputer, cause the microcomputer to perform a regeneration treatment that burns the particulate matter trapped in the filter in the exhaust gas purifying device,
wherein the memory further stores instructions that, when executed by the microcomputer, cause the microcomputer to execute:
a first trapping amount estimating unit to estimate a first trapping amount (Q1) of particulate matter trapped in the filter based on at least a rotational speed of the engine and a fuel injection quantity,
a second trapping amount estimating unit to estimate a second trapping amount (Q2) of particulate matter trapped in the filter based upon a differential pressure (ΔP=P1−P2) that is at least a difference between a pressure (P1) at an inlet side of the filter and a pressure (P2) at an outlet side thereof,
a regeneration determining unit to determine that the regeneration treatment is to be performed when at least one of the first trapping amount (Q1) and the second trapping amount (Q2) is greater than or equal to a preset trapping amount threshold value (Qs), and
a malfunction determining unit to determine that there is a malfunction in the regeneration device when the second trapping amount (Q2) is greater than the first trapping amount (Q1), a difference (ΔQ=Q2−Q1) between the first trapping amount (Q1) and the second trapping amount (Q2) is equal to or more than a preset predetermined value (ΔQs), and a continuous time (T) in a state where the difference (ΔQ=Q2−Q1) is equal to or more than the predetermined value (ΔQs) is equal to or more than a preset predetermined time (Ts).

2. The construction machine according to claim 1, wherein the regeneration device includes a fuel injection device, and the microcomputer causes the fuel injection device to perform post injection to burn the particulate matter.

3. A construction machine comprising:
an automotive vehicle body;
an engine that is mounted on the vehicle body;
an exhaust gas purifying device that is provided in an exhaust side of the engine and includes a filter for trapping particulate matter in an exhaust gas discharged from the engine; and
a regeneration device that includes a microcomputer and memory, where the memory stores instructions that, when executed by the microcomputer, cause the microcomputer to perform a regeneration treatment that burns the particulate matter trapped in the filter in the exhaust gas purifying device, wherein the memory further stores instructions that, when executed by the microcomputer, cause the microcomputer to execute:

a first trapping amount estimating unit to estimate a first trapping amount (Q1) of particulate matter trapped in the filter based on at least a rotational speed of the engine and a fuel injection quantity, a second trapping amount estimating unit to estimate a second trapping amount (Q2) of particulate matter trapped in the filter based upon a differential pressure ($\Delta P=P1-P2$) that is at least a difference between a pressure (P1) at an inlet side of the filter and a pressure (P2) at an outlet side thereof, a regeneration determining unit to determine that the regeneration treatment is to be performed when at least one of the first trapping amount (Q1) and the second trapping amount (Q2) is greater than or equal to a preset trapping amount threshold value (Qs), and a malfunction determining unit to determine that there is a malfunction in the regeneration device when the second trapping amount (Q2) is greater than the first trapping amount (Q1), an interval ($\Delta K$) of the regeneration treatment executed when the second trapping amount (Q2) is greater than or equal to the trapping amount threshold value (Qs) is within a preset predetermined time ($\Delta Ks$), and a number of times (C) the regeneration treatment is performed within the predetermined time ($\Delta Ks$) reaches a preset predetermined number of times (Cs).

4. The construction machine according to claim 3, wherein the regeneration device includes a fuel injection device, and the microcomputer causes the fuel injection device to perform post injection to burn the particulate matter.

5. A construction machine comprising:
an automotive vehicle body;
an engine that is mounted on the vehicle body;
an exhaust gas purifying device that is provided in an exhaust side of the engine and includes a filter for trapping particulate matter in an exhaust gas discharged from the engine; and
a regeneration device that includes a microcomputer and memory, where the memory stores instructions that, when executed by the microcomputer, cause the microcomputer to perform a regeneration treatment that burns the particulate matter trapped in the filter in the exhaust gas purifying device, wherein the memory further stores instructions that, when executed by the microcomputer, cause the microcomputer to execute:

a first trapping amount estimating unit to estimate a first trapping amount (Q1) of particulate matter trapped in the filter based on at least a rotational speed of the engine and a fuel injection quantity, a second trapping amount estimating unit to estimate a second trapping amount (Q2) of particulate matter trapped in the filter based upon a differential pressure ($\Delta P=P1-P2$) that is at least a difference between a pressure (P1) at an inlet side of the filter and a pressure (P2) at an outlet side thereof, a regeneration determining unit to determine that the regeneration treatment is to be performed when at least one of the first trapping amount (Q1) and the second trapping amount (Q2) is greater than or equal to a preset trapping amount threshold value (Qs), and a malfunction determining unit to determine that there is a malfunction in the regeneration device when the second trapping amount (Q2) is greater than the first trapping amount (Q1), a difference ($\Delta Q=Q2-Q1$) between the first trapping amount (Q1) and the second trapping amount (Q2) is equal to or more than a preset predetermined value ($\Delta Qs$), an interval ($\Delta L$) of the regeneration treatment is within a preset predetermined time ($\Delta Ls$), and a number of times (M) by which the regeneration treatment is performed within the predetermined time ($\Delta Ls$) reaches a preset predetermined number of times (Ms).

6. The construction machine according to claim 5, wherein the regeneration device includes an intake throttle valve disposed at an intake side of the engine, and an exhaust throttle valve disposed at the exhaust side of the engine, and the microcomputer causes at least one of the intake throttle valve and the exhaust throttle valve to throttle a flow through the engine to burn the particulate matter.

* * * * *